US012644430B2

(12) United States Patent
Morris et al.

(10) Patent No.: US 12,644,430 B2
(45) Date of Patent: Jun. 2, 2026

(54) HYDROKINETIC TURBINE AND ARRAY PERFORMANCE OPTIMIZATION BY DYNAMIC TUNING

(71) Applicant: EMRGY, INC., Atlanta, GA (US)

(72) Inventors: Emily Morris, Atlanta, GA (US); Thomas R. Cuthbert, III, Atlanta, GA (US); John Tuttle, Atlanta, GA (US); Thorsten Stoesser, London (GB); Michael Savoie, Atlanta, GA (US); Brandon Davis, Atlanta, GA (US)

(73) Assignee: Emrgy, Inc., Atlanta, GA (US)

( * ) Notice: Subject to any disclaimer, the term of this patent is extended or adjusted under 35 U.S.C. 154(b) by 0 days.

(21) Appl. No.: 18/354,450

(22) Filed: Jul. 18, 2023

(65) Prior Publication Data

US 2024/0026854 A1 Jan. 25, 2024

Related U.S. Application Data

(63) Continuation of application No. PCT/US2022/022917, filed on Mar. 31, 2022.
(Continued)

(51) Int. Cl.
*F03B 15/16* (2006.01)
*F03B 13/08* (2006.01)
*F03B 15/00* (2006.01)

(52) U.S. Cl.
CPC .............. *F03B 15/16* (2013.01); *F03B 13/08* (2013.01); *F03B 15/005* (2013.01);
(Continued)

(58) Field of Classification Search
CPC .......... F05B 3/14; F05B 13/08; F05B 15/005; F05B 15/06; F05B 15/16; F05B 2220/32;
(Continued)

(56) References Cited

U.S. PATENT DOCUMENTS 6,109,863 A * 8/2000 Milliken ............... F03B 17/065 415/60
6,320,273 B1 11/2001 Nemec
(Continued)

FOREIGN PATENT DOCUMENTS

CN 103001454 A 3/2013
CN 104393725 A 3/2015
(Continued)

OTHER PUBLICATIONS

Davey, "Axial Flux Cycloidal Magnetic Gears", IEEE Transactions on Magnetics 50:4, 2014, 8100607, 7 pages.
(Continued)

*Primary Examiner* — Sang K Kim
(74) *Attorney, Agent, or Firm* — Husch Blackwell LLP; Bryan D. Stewart; Andrew C. Landsman

(57) ABSTRACT

A hydrokinetic turbine system with dynamic tuning capabilities is disclosed. Individual hydrokinetic turbine units are dynamically tuned to accommodate changes in height and flow velocity corresponding to water in a waterway. Dynamically tuning the turbine units to accommodate waterway changes optimizes power generation output. Dynamically tuning a turbine system includes raising or lowering turbine blade height, extending or retracting turbine blade length, and narrowing or widening a turbine mouth, channel, and exit through which water flows. The hydrokinetic turbines may be arranged in an array along a waterway, and each hydrokinetic turbine in the array is connected over a controls system configured to adjust turbine characteristics at each turbine unit in the array for optimizing power generation output for the waterway in which the turbine array is installed.

11 Claims, 16 Drawing Sheets

Related U.S. Application Data

(60) Provisional application No. 63/168,748, filed on Mar. 31, 2021.

(52) U.S. Cl.
CPC ..... *F05B 2220/32* (2013.01); *F05B 2220/706* (2013.01); *F05B 2270/1033* (2013.01)

(58) Field of Classification Search
CPC ........ F05B 2220/706; F05B 2270/1033; F03B 3/14; F03B 13/08; F03B 15/005; F03B 15/06; F03B 15/16
See application file for complete search history.

(56) References Cited

U.S. PATENT DOCUMENTS

| | | | | |
|---|---|---|---|---|
| 6,793,458 | B2 | 9/2004 | Kawai et al. | |
| 7,944,075 | B2 | 5/2011 | Boone | |
| 8,100,607 | B2 | 1/2012 | Custers | |
| 8,246,299 | B2 | 8/2012 | Razzell et al. | |
| 8,616,829 | B2 | 12/2013 | Becker et al. | |
| 8,807,917 | B2 | 8/2014 | Park et al. | |
| 8,840,364 | B2 | 9/2014 | Warton et al. | |
| 8,876,448 | B1 | 11/2014 | Hess et al. | |
| 9,006,919 | B2 * | 4/2015 | Lynch | F03B 17/06 416/223 R |
| 9,041,235 | B1 | 5/2015 | Hunter et al. | |
| 9,337,712 | B2 | 5/2016 | Storaasli | |
| 9,618,002 | B1 | 4/2017 | Cabra et al. | |
| 10,458,386 | B2 | 10/2019 | Watanabe et al. | |
| 11,319,920 | B2 * | 5/2022 | Blodgett | H02K 7/1823 |
| 11,891,980 | B2 * | 2/2024 | Farb | H02J 3/46 |
| 2002/0197147 | A1 | 12/2002 | Kawai et al. | |
| 2004/0232702 | A1 | 11/2004 | He | |
| 2007/0020097 | A1 | 1/2007 | Ursua | |
| 2007/0063520 | A1 | 3/2007 | Ahmad | |
| 2008/0018115 | A1 | 1/2008 | Orlov | |
| 2008/0084067 | A1 | 4/2008 | Hill | |
| 2008/0267777 | A1 | 10/2008 | Lux | |
| 2009/0091135 | A1 | 4/2009 | Janca et al. | |
| 2009/0129928 | A1 | 5/2009 | Sauer et al. | |
| 2009/0134623 | A1 | 5/2009 | Krouse | |
| 2009/0167028 | A1 | 7/2009 | Akamine | |
| 2009/0230686 | A1 | 9/2009 | Catlin | |
| 2009/0315329 | A1 | 12/2009 | Duffey et al. | |
| 2010/0032952 | A1 | 2/2010 | Hatch et al. | |
| 2010/0084862 | A1 | 4/2010 | Unno | |
| 2010/0194112 | A1 | 8/2010 | Vince | |
| 2010/0253081 | A1 | 10/2010 | Schlabach et al. | |
| 2010/0295316 | A1 | 11/2010 | Grassman | |
| 2011/0037333 | A1 | 2/2011 | Atallah et al. | |
| 2011/0254271 | A1 | 10/2011 | Freeman et al. | |
| 2012/0023606 | A1 | 1/2012 | Rehman | |
| 2012/0099977 | A1 | 4/2012 | Churchill et al. | |
| 2012/0223606 | A1 | 9/2012 | Storaasli | |
| 2013/0069369 | A1 | 3/2013 | Salehpoor | |
| 2013/0071240 | A1 | 3/2013 | Chir et al. | |
| 2013/0099499 | A1 * | 4/2013 | Levin | F03B 17/063 290/52 |
| 2013/0115045 | A1 | 5/2013 | Korac | |
| 2013/0134815 | A1 | 5/2013 | Powell et al. | |
| 2013/0266378 | A1 | 10/2013 | French, Sr. | |
| 2013/0285383 | A1 | 10/2013 | Belarbi | |
| 2013/0285384 | A1 | 10/2013 | Schultz et al. | |
| 2013/0334825 | A1 | 12/2013 | Roter et al. | |
| 2014/0138954 | A1 | 5/2014 | Antonucci et al. | |
| 2014/0161642 | A1 | 6/2014 | Rajadhyaksha et al. | |
| 2014/0183996 | A1 | 7/2014 | He et al. | |
| 2014/0265335 | A1 * | 9/2014 | Andreis | F03B 17/063 416/210 A |
| 2015/0226174 | A1 | 8/2015 | Duchene et al. | |
| 2015/0343674 | A1 | 12/2015 | Lowth et al. | |
| 2016/0010620 | A1 | 1/2016 | Han | |
| 2016/0049855 | A1 | 2/2016 | Davey | |
| 2017/0030326 | A1 | 2/2017 | Han | |
| 2017/0054384 | A1 | 2/2017 | Post | |
| 2017/0138333 | A1 | 5/2017 | Toran | |
| 2017/0292499 | A1 | 10/2017 | Sia | |
| 2017/0298748 | A1 | 10/2017 | Vetters et al. | |
| 2018/0106236 | A1 | 4/2018 | Lee | |
| 2020/0025040 | A1 | 1/2020 | Meyer et al. | |

FOREIGN PATENT DOCUMENTS

| | | | | |
|---|---|---|---|---|
| EP | 1849999 | A2 | 10/2007 | |
| GB | 2408778 | A | 6/2005 | |
| RU | 2216662 | C1 | 11/2003 | |
| WO | 2006133703 | A1 | 12/2006 | |
| WO | 2011095240 | A2 | 8/2011 | |
| WO | 2011160210 | A2 | 12/2011 | |
| WO | 2013143596 | A1 | 10/2013 | |
| WO | WO-2015168810 | A1 * | 11/2015 | F03B 15/16 |
| WO | 2016004506 | A1 | 1/2016 | |
| WO | 2017172747 | A1 | 10/2017 | |
| WO | 2020023693 | A1 | 1/2020 | |

OTHER PUBLICATIONS

International Search Report and Written Opinion mailed Dec. 22, 2016 for International Application No. PCT/US2016/057130.
International Search Report and Written Opinion dated Jun. 22, 2017 in International Application No. PCT/US17/024511.
Extended European Search Report dated Oct. 28, 2019 for European Pat. Appl. No. 17776448.7.
International Search Report and Written Opinion mailed Jan. 3, 2019 for International Application No. PCT/US2018/051371.
International Search Report & Written Opinion mailed May 27, 2020 for International Application No. PCT/US2020/023693.
International Search Report and Written Opinion mailed Jul. 27, 2022 for international Application No. PCT/US22/22917.

* cited by examiner

HYDROKINETIC TURBINE AND ARRAY PERFORMANCE OPTIMIZATION BY DYNAMIC TUNING

CROSS-REFERENCE TO RELATED APPLICATIONS

This application is a continuation of International Patent Application No. PCT/US22/917, filed Mar. 31, 2022, entitled "HYDROKINETIC TURBINE AND ARRAY PERFORMANCE OPTIMIZATION BY DYNAMIC TUNING," which claims the benefit of, and priority to, U.S. Provisional Patent Application No. 63/168,748, filed on Mar. 31, 2021, entitled "HYDROKINETIC TURBINE AND ARRAY PERFORMANCE OPTIMIZATION BY DYNAMIC TUNING," the disclosures of which are incorporated by reference herein in their entireties.

This application hereby further incorporates by reference in their entireties the patents and patent applications listed in Table 1.

TABLE 1

List of Incorporated Disclosures.

| No. | Title | Application No. | Filing Date |
|---|---|---|---|
| 1. | CYCLOIDAL MAGNETIC GEAR SYSTEM | 62/241,707 | Oct. 14, 2015 |
| 2. | CYCLOIDAL MAGNETIC GEAR SYSTEM | 15/294,074 | Oct. 14, 2016 |
| 3. | CYCLOIDAL MAGNETIC GEAR SYSTEM | PCT/US2016/057130 Int'l App of 62/313,856 62/241,707 | Oct. 14, 2016 |
| 4. | TWIN-TURBINE HYDROKINETIC ENERGY SYSTEM | 62/313,856 | Mar. 28, 2016 |
| 5. | TURBINE HYDROKINETIC ENERGY SYSTEM UTILIZING CYCLOIDAL MAGNETIC GEARS | PCT/US17/24511 Int'l App of 62/313,856 | Mar. 28, 2017 |
| 6. | TURBINE HYDROKINETIC ENERGY SYSTEM UTILIZING CYCLOIDAL MAGNETIC GEARS | 16/089,943 U.S. Nat'l Phase (371) of PCT/US17/24511 | Sep. 28, 2018 |
| 7. | TURBINE HYDROKINETIC ENERGY SYSTEM UTILIZING CYCLOIDAL MAGNETIC GEARS | 17776448.7 EP Nat'l Phase of PCT/US17/24511 | Oct. 22, 2018 |
| 8. | HYDRO TRANSITIONS | 62/559,258 | Sep. 15, 2017 |
| 9. | HYDRO TRANSITION SYSTEMS AND METHODS OF USING THE SAME | 16/133,285 10,724,497 NPA of 62/559,258 | Sep. 17, 2018 Jul. 28, 2020 |
| 10. | HYDRO TRANSITION SYSTEMS AND METHODS OF USING THE SAME | 16/899,182 CON of 16/133,285 | Jun. 11, 2020 |
| 11. | HYDRO TRANSITION SYSTEMS AND METHODS OF USING THE SAME | PCT/US18/51371 Int'l App of 62/559,258 | Sep. 17, 2018 |
| 12. | HYDRO TRANSITION SYSTEMS AND METHODS OF USING THE SAME | MX/a/2020/002902 MX Nat'l Phase of PCT/US18/5137 | Mar. 13, 2020 |
| 13. | HYDRO TRANSITION SYSTEMS AND METHODS OF USING THE SAME | 18855328.3 EP Nat'l Phase of PCT/US18/5137 | Apr. 7, 2020 |
| 14 | CASSETTE | 62/687,520 | Jun. 2, 2018 |
| 15. | CASSETTE | 16/447,694 | Jun. 2, 2019 |
| 16. | FLUME | 62/820,475 | Mar. 19, 2019 |
| 17. | FLUME | PCT/US20/23693 Int'l App of 62/820,475 | Mar. 19, 2020 |
| 18. | FLUME | 16/824,470 NPA of 62/820,475 | Mar. 19, 2020 |

STATEMENT REGARDING FEDERALLY SPONSORED RESEARCH OR DEVELOPMENT

This invention was made with government support under DOE-ARPA-E: DE-AR0001445 awarded by the Department of Energy. The government has certain rights in the invention.

TECHNICAL FIELD

The present disclosure relates to hydrokinetic turbine systems, and more specifically to hydrokinetic turbine systems in an array configuration and optimized via dynamic tuning.

BACKGROUND

Traditional turbine systems installed in waterways are typically static in their configurations after initial installation. Accordingly, while characteristics of water flowing through the waterway may change (e.g., water levels rise, flow velocity increases, etc.), the traditional turbine systems are set in their initial configurations. Not only are these traditional turbine system configurations inefficient on an individual turbine basis, but also they create inefficiencies for other upstream and/or downstream turbine systems. Therefore, there includes a long-felt but unresolved need for hydrokinetic turbine systems with dynamic tuning for performance optimization, and more particularly hydrokinetic systems with dynamic tuning in an array configuration.

BRIEF SUMMARY OF THE DISCLOSURE

According to various embodiments, a hydrokinetic turbine system with dynamic tuning capabilities is disclosed. In at least one embodiment, individual hydrokinetic turbine units are dynamically tuned to accommodate changes in height and flow velocity corresponding to water in a waterway. In some embodiments, dynamically tuning the turbine units to accommodate waterway changes optimizes power generation output. Dynamically tuning a turbine system may include raising or lowering turbine blade height, extending or retracting turbine blade length, and narrowing or widening a turbine mouth, channel, and exit through which water flows. According to at least one embodiment, the hydrokinetic turbines may be arranged in an array along a waterway, and each hydrokinetic turbine in the array is connected over a controls system configured to adjust turbine characteristics at each turbine unit in the array for optimizing power generation output for the waterway in which the turbine array is installed.

These and other aspects, features, and benefits of the disclosed systems, methods, and processes will become apparent from the following detailed written description of the embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers can be used throughout the drawings to refer to the same or like elements of an embodiment, and wherein.

DETAILED DESCRIPTION

Figure 1:
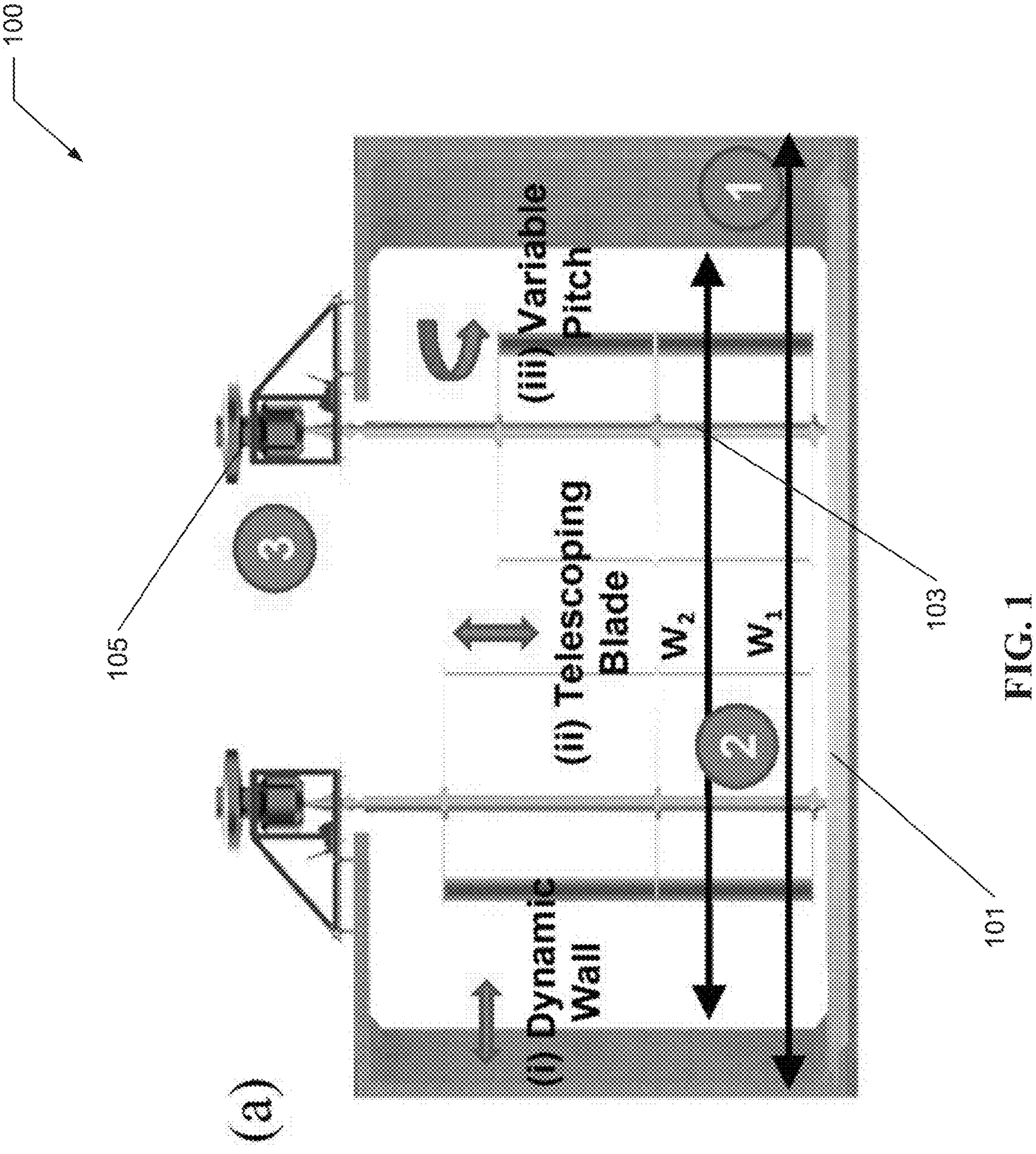
FIG. 1 shows an exemplary hydrokinetic turbine system, according to one embodiment of the present disclosure.

For the purpose of promoting an understanding of the principles of the present disclosure, reference can now be made to the embodiments illustrated in the drawings and specific language can be used to describe the same. It can, nevertheless, be understood that no limitation of the scope of the disclosure may be thereby intended; any alterations and further modifications of the described or illustrated embodiments, and any further applications of the principles of the disclosure as illustrated therein can be contemplated as would normally occur to one skilled in the art to which the disclosure relates. All limitations of scope should be determined in accordance with and as expressed in the claims.

Whether a term may be capitalized may be not considered definitive or limiting of the meaning of a term. As used in this document, a capitalized term shall have the same meaning as an uncapitalized term, unless the context of the usage specifically indicates that a more restrictive meaning for the capitalized term may be intended. However, the capitalization or lack thereof within the remainder of this document may be not intended to be necessarily limiting unless the context clearly indicates that such limitation may be intended.

For purposes of describing exemplary elements and features of the present technology, portions of the following description are presented in the context of tidal, riverine, and manmade bodies of water. References to specific bodies of water herein are exemplary in nature and it can be understood that the present technology can be implemented in any suitable water flow system. For example, embodiments described in the context of a canal environment can be applied to and implemented in a tidal or natural riverine environment.

Briefly described, and according to one embodiment, aspects of the present disclosure generally relate to: 1) "dynamic tuning" of rotor dimensions, blade pitch angle, transition wall blockage (or coverage) and flume accelerator wall profile to improve water-to-mechanical (Cp) conversion efficiency; 2) novel power conversion hardware to optimize mechanical to electrical efficiency; and 3) module- and system-level control algorithms employing novel optimization and machine learning techniques to manage both module and array hydrodynamic features in real time. The systems and processes may consider various real-time inputs including water depth and velocity, and consider design elements such as rotor size, flume dimensions, rotor speed, overall blockage values of flume and rotor area relative to total canal cross-sectional area, flume-opening area relative to flume cross-sectional area, and rotor area relative to flume opening area. The systems and processes may adjust turbine component positions or shapes to adjust blockage ratios to previously determined (or real-time determined) optimum values. The systems and processes may emphasize improved reliability and reduced maintenance costs (OPEX), especially for the natural riverine environment.

Overview

Exploiting the embodied power of natural and man-made flow water systems (e.g., such as tidal and riverine resources, man-made water transport infrastructure, etc.) offer the potential of a very significant contribution to the world's energy needs. Various embodiments of the present systems and methods provide a modular hydrokinetic (HK) platform that can deliver 5-25 kW of clean electric power depending on the characteristics of the water system in which it may be deployed.

When deployed in multi-unit arrays, system power levels of 50-1,000 kW can be achieved. Arrays can be achieved through a combination of cross-stream and up/down stream deployment of multiple HK modules. Embodiments of the present system demonstrate low manufacturing costs, high reliability, and competitive levelized cost of energy (LCOE). Embodiments of the present system may be modular, portable, hydrodynamically designed to optimize performance, and outfitted with a power control system that may be designed for grid connection at the individual HK module or array level. Embodiments of the present system may exploit man-made riverine/canal space to sidestep typical environmental and regulatory hurdles of the natural marine environment. Man-made riverine and canal space may be characterized by, in many cases, non-biologic, non-navigation waterways and may be also characterized by a controlled flow environment that enables high coefficients of power and capacity factors and thus low LCOE. This environment can support a low-cost approach to both anchoring (self-ballasted design rests on the riverine bottom) and above water power takeoff. The present disclosure refers to man-made riverine and canal spaces for purposes of illustrating and describing exemplary system embodiments. Various embodiments of the present systems and processes can apply to deeper water applications and other bodies of water.

Factors in making the transition to the natural riverine environment can include: 1) achieving high unit performance through higher water-to-wire efficiencies than traditional designs; 2) maintaining low product and installation cost and high durability (low OPEX); and 3) achieving high system efficiency with elegant but low-cost power conversion and controls systems. Various embodiments of the present system demonstrate hydrodynamic "tuning" capabilities to maximize water-to-mechanical (Cp) conversion across variable operating conditions, and demonstrate improved power conversion technology for enhanced reliability and performance.

1. Hydrodynamic tuning: High coefficients of power (e.g., about 0.6-1.0 or about 0.6-0.7) can be achieved by utilizing a flume and rotor design that optimizes the acceleration of water through the rotor swept area. The exact combination of rotor size relative to the flow aperture ("dynamic rotor impedance"), and flow aperture relative to full product profile aperture ("flume impedance") can be tunable based on the flow conditions. A dynamic design may be introduced to modulate the impedances for maximum power output.
2. Power conversion and control technology: Power control can include a system for both the efficient conversion of wild AC power from generating turbines into grid or microgrid quality power and the control of individual dynamic turbines and turbine arrays. The layered control architecture can include algorithms and machine learning for individual turbine control to correlate performance with dynamic tuning elements of the HK module. System level controls can also incorporate machine learning to correlate module and array performance interactions. Real-time dynamic tuning and control of inter-dependent power generating devices has been demonstrated in unrelated industries, but never in an array of distributed hydrokinetic devices.

In at least one embodiment, the present systems and processes provide for over 1 Quad of energy generation worldwide and more than 150 gigatons of CO2 displacement on an annual basis.

These and other aspects, features, and benefits of the claimed invention(s) can become apparent from the following detailed written description of the preferred embodiments and aspects taken in conjunction with the following drawings, although variations and modifications thereto may be effected without departing from the spirit and scope of the novel concepts of the disclosure.

Conceptual Basis

Hydrokinetic power generation may be based on two primary factors: rotor swept area (A=rotor diameter×blade height) and water velocity cubed (v3). Two strategies for maximizing the conversion efficiency can be: 1) increasing the effective swept area with hydrodynamic features; and 2) head creation as a result of flow impedance. Various embodiments of the present disclosure exploit both of these tactics in, for example, the fully confined system of man-made canals or a partially confined system of the natural riverine environment. In one or more embodiments, the hydrokinetic power generation processes and systems herein can be applied to any water flow system.

In translating the product design to less confined riverine systems, various embodiments of the present disclosure can exploit each of these effects through local confinement. FIG. 1 illustrates the main features of an exemplary hydrokinetic system 100, which can include a hydrodynamic flume 101, one or more rotating assemblies 103, and a power take-off system 105.

The flume cross-sectional area may be characterized by hydrodynamic walls that serve to accelerate the water through the vertical axis turbine rotor cross-section defined by a rotor diameter (D) and blade height (H).

Figure 2:
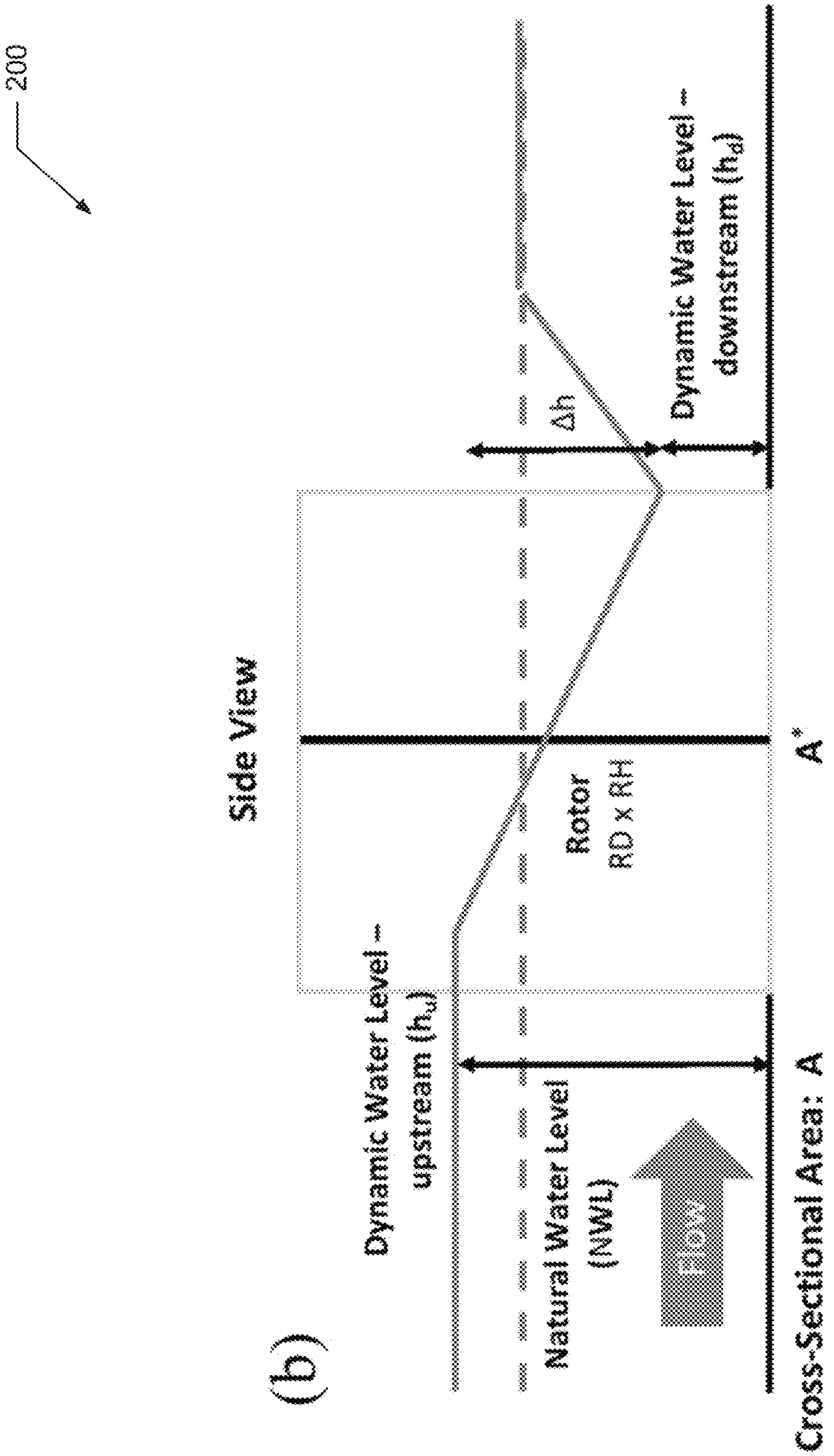
FIG. 2 shows an exemplary hydrokinetic environment, according to one embodiment of the present disclosure.

FIG. 2 shows an exemplary hydrokinetic environment 200. As shown in FIG. 2, the solid walls and porous rotating assembly constitute blockage or impedance to water flow, producing head (or water level rise). The existence of head also contributes to water acceleration through the flume. The design trade space for this approach involves balancing the positive (higher water velocity→higher power) with the negative (water diversion around modules→reduced flow through module) impacts of blockage. One or more embodiments of the present disclosure can utilize computational fluid dynamics (CFD) to evaluate and verify performance of a hydrokinetic system (e.g., in a digital environmental model, such as the hydrokinetic environment 200).

A power conversion & controls platform that encompasses the riverine water turbine concept may be connected to the utility- or micro-grid, and also wirelessly connected to a cloud-based platform for system level coordination. When part of a microgrid environment, other distributed energy resources (DER) and storage can be added to this system, providing third-party integration for proper system coordination and operation.

Embodiments of the present disclosure provide a scalable and configurable riverine multi-turbine array system controlled by a flexible but robust hardware platform that offers system optimization in different installation environments. In at least one embodiment, the present system can: 1) enable high operational performance at both the module and array level 2) drive low-cost manufacturability and installation by employing a combination of commercial-off-the-shelf (COTS), easily machined custom, and novel low-cost substitute parts and materials 3) offer complexity of dynamic design elements at low operational cost (OPEX); and 4) provide clean power with minimal impact on the local environment.

In one or more embodiments, the present system provides:

1. A Coefficient of Power at both the HK module and array level of 0.6-1.0 (e.g., or about or about 0.6-0.7) across the variable operating conditions, achieved through dynamic tuning of the HK module
2. Successful demonstration of alternative materials and/or additive manufacturing that provide the properties of stainless steel and/or concrete at reduced cost and weight.
3. OPEX costs of ≤$120/kW/yr for a 10 kW rated twin-turbine generation platform
4. Successful demonstration of a layered power conversion and control architecture to sustain high Cp at the HK module level across variable operating conditions.

Considerations

A potential challenge in achieving economical HK power production may lie in lowering cost while maintaining or improving performance and low OPEX.

Variable operating conditions (e.g., such as water velocities of 1.0-2.0 m/s) can lead to inefficiencies at the module level and a cascading of these inefficiencies at the array level-negatively impacting the performance. The use of concrete and stainless steel may lead to added weight and cost, negatively impacting cost. Adding dynamic tuning can improve performance, but could add to operational costs. These challenges in hydrokinetic array design and operation can be addressed in various embodiments of the present hydrokinetic systems and processes.

In at least one embodiment, the present system includes: 1) mechanical systems (e.g., including telescoping blade, variable pitch blade, dynamic accelerator wall, variable blockage transition); and 2) power systems and controls (e.g., including efficient power conversion, real-time control of dynamic design elements, system control of array performance). Embodiments of the present systems and processes can provide optimized Cp, minimal losses across variable water conditions, and increases in performance efficiency.

Exemplary Advantages

Embodiments of the present systems and processes can achieve competitive levelized cost of energy values utilizing hydrokinetic power production in all hydrokinetic environments (e.g., riverine, tidal, man-made, etc.). One or more embodiments of the present system include dynamic operation of the generating turbine and optimization of array performance through power systems and controls. Dynamic operation and control of hydrokinetic arrays has not been previously achieved.

Figure 3:
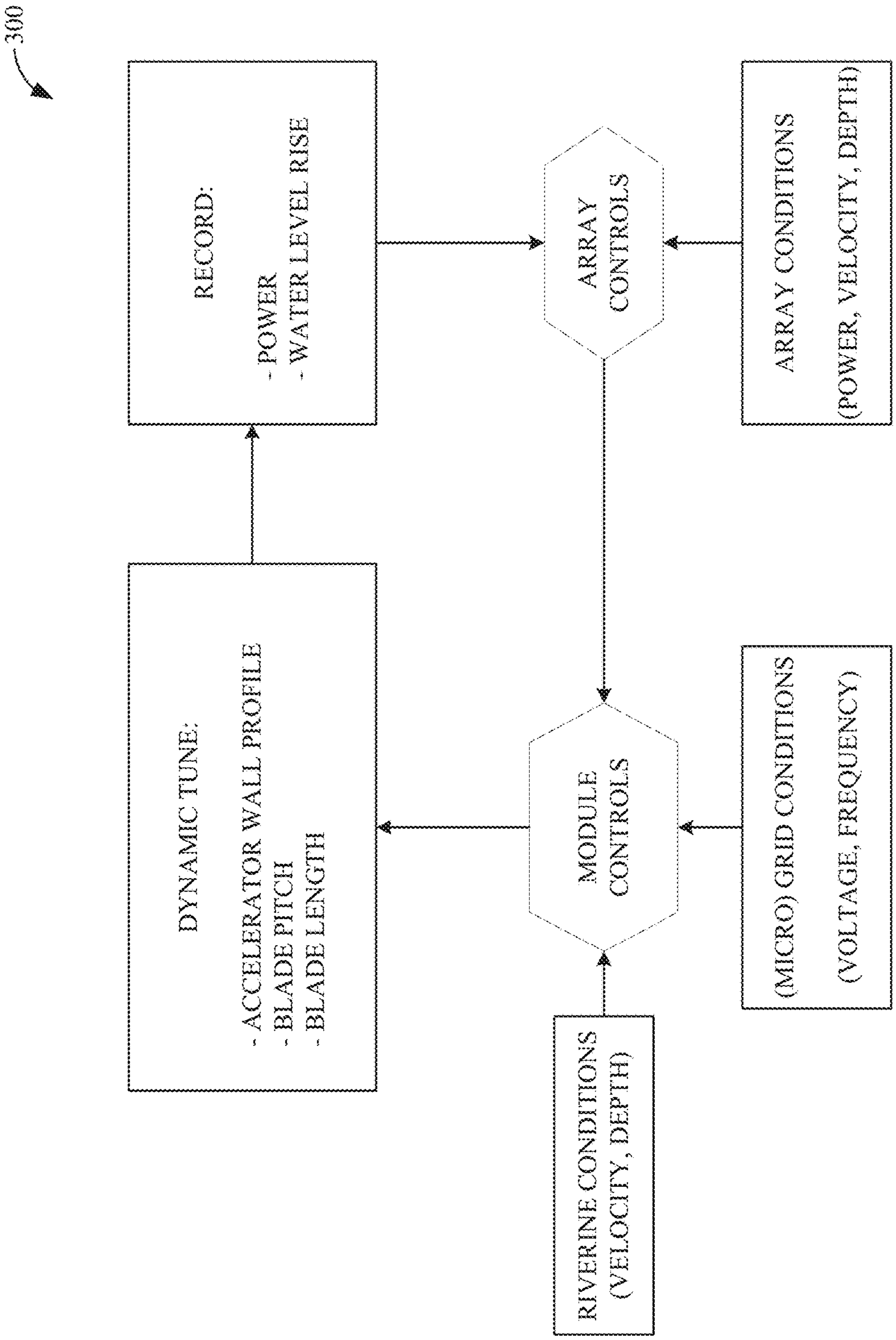
FIG. 3 shows an exemplary tuning and control scheme, according to one embodiment of the present disclosure.

Exemplary advantages of the present systems and processes include:

1. Achieve high coefficient of power (Cp) (e.g., about 0.6-1.0 or about 0.6-0.7) across variable operating conditions. High Cp may be achieved at any particular operating condition (water velocity, water depth) by enhancing velocity through the rotor swept area and by maximizing the swept area for a particular water depth. FIG. 3 shows an exemplary control and tuning scheme for optimizing system performance based on water flow conditions, power grid conditions, and array conditions (e.g., operating conditions of hydrokinetic systems). Embodiments of the present systems have demonstrated higher Cp values in confined waterways and initial CFD work suggests that the range 0.6-1.0 (e.g., or about 0.6-0.7) may be achievable in less confined waterways of riverine systems. In at least one embodiment, the present system (e.g., or a HK module include therein) can produce about 10-50 kW, 10-20 kW, 16-17 kW, 20-30 kW, 30-40 kW, or 40-50 kW.
2. Demonstrate layered power conversion and control architecture. At least one embodiment of the present system includes a layered architecture that can ensure high coefficients of power can be achieved at the HK module across variable operating conditions while scalability to array formation may be guaranteed. Integration of distributed sensing, to capture environmental and electrical variables, and external information about grid conditions can be done through the cloud-based platform. Novel machine learning and model predictive control optimization techniques can account for uncertainties around HK module power production, forecasts and local network operating constraints. System outputs can be sent to the power conversion units of each HK module to control local operation

Approaches

Figure 4:
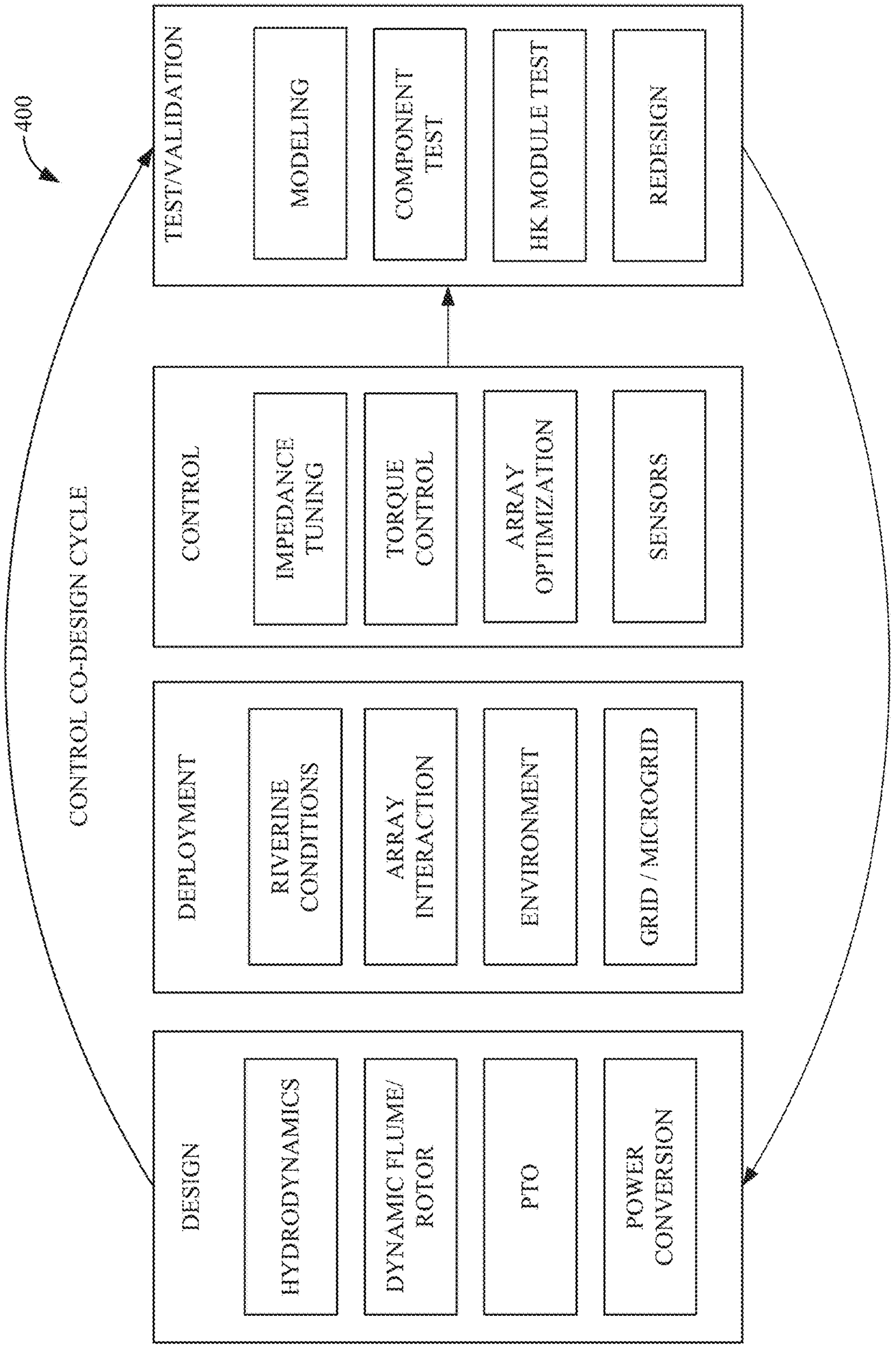
FIG. 4 shows an exemplary system control scheme, according to one embodiment of the present disclosure.

General Approach: One or more embodiments of the present system can integrate mechanical and electrical operating systems (e.g., and variables associated with the same) to optimize performance at the system and sub-system level across a range of operating conditions. Real-time optimization may be enabled by real-time dynamic adjustment of key product features using both local and cloud-based control systems. As shown in FIG. 4, the system can integrate (and optimize performance based on various combinations of):

1. 1. Design: The important features of/contributors to the product design include hydrodynamics, flume and rotor design, power take-off systems and power conversion for grid or micro-grid connection.
2. 2. Deployment: The environment in which the generator operates including seasonal riverine features, the interdependence of units in an array configuration, and the nature of the grid or micro-grid to which power can be provided.
3. 3. Control: Sensors can provide input on environmental conditions, local algorithms can dynamically tune design features for power optimization, system controls can further provide feedback to the generators and to the user/facility owner on performance.
4. 4. Test & Validation: Testing can occur in the computational environment, at the component level and at the full HK module level. Testing provides critical data that may be used to iterate on design elements.

Figure 5:
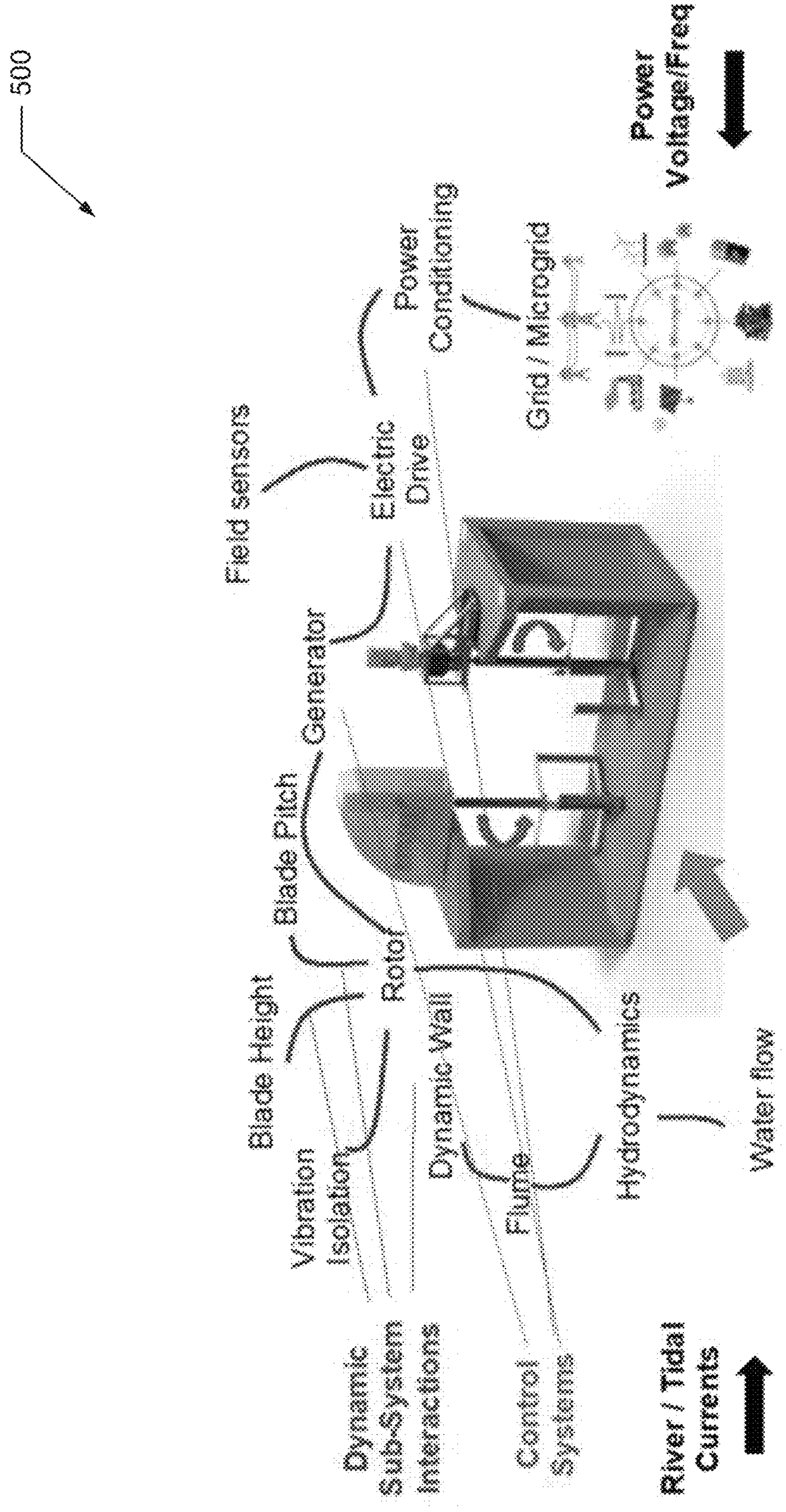
FIG. 5 shows an exemplary hydrokinetic environment, according to one embodiment of the present disclosure.

FIG. 5 shows an exemplary hydrokinetic environment 500. In various embodiments, a hydrokinetic system can be defined by several different metrics, such as, for example, performance, dynamics, controllability, efficiency, robustness, survivability, resiliency, and economics. In at least one embodiment, FIG. 5 demonstrates a plurality of exemplary parameters and other factors that can impact hydrokinetic system metrics.

Embodiments of the present system can use external sensor inputs that help optimize the system's operation. The system can be tested for various dynamic operational cases, in order to confirm the system's stability and resilience in the field environment.

Embodiments of the present systems and processes can implement self-ballasting to achieve anchoring (e.g., a bottom-resting device). In some embodiments, electrical systems are positioned above the water line. These two elements lead can to practical limitations in deployment water depth. In some embodiments, the system includes floatation and/or submersible power system strategies to expand the operating envelope. An initial focus on commercialization in the smaller riverine systems can support future expansion into larger/deeper water systems.

In at least one embodiment, the present system includes elements based on the Darrieus design for vertical axis turbines originally developed in 1926. This design uses lift on the blades as the method of generating torque at the rotor shaft rather than drag allowing for a simpler manufacturing process and higher efficiency. A Darrieus-type turbine produces most of its energy in the first 90 degrees of its rotation, i.e. on the second half of the upstroke, the so-called power stroke. For a turbine of the present system, the power stroke may occur with the blade being closest approach to the accelerator wall, which in turn leads to the highest relative velocity over the blade and thereby maximizing the lift force. This may be an important factor in dynamic alteration of the blade/wall relationship.

HK power generation may be described by Equation 1

$$P=\frac{1}{2}\rho*Cp*\mu e*A*v3 \quad \text{(Equation 1)}$$

In Equation 1, ρ may be the density of the fluid, A may be the swept area of the rotor, v may be the water velocity, Cp describes the efficiency of the water to mechanical power conversion process and μe may be the efficiency of mechanical to electrical power conversion. Cp may be often considered to be limited by the Betz value of 59.3%, which may be the maximum theoretical conversion efficiency of a wind or water turbine in an "open" system. Tidal and riverine systems can be, however, partially confined waterways (with a solid boundary at the river/sea bed and a fairly rigid phase-transition boundary can be the water surface) and thus can be not subject to this limitation. The degree and efficiency with which power can be extracted from a flowing system may be highly impacted by, first, the relative widths of an individual turbine and the array and, second, the relative widths of the array and the riverine or tidal system of interest. For example, the river may be ~160 m wide, or roughly 25× the width of the proposed twin turbine design. As arrays become wider, it becomes less likely that flow impedance can drive water around the array. The degree of head generation, and the associated power amplification it produces, can be dependent on these dynamics. However, riverine systems may have navigation and other considerations that limit the width of the array.

Embodiments of the present systems and processes can consider such site-specific design features that can impact overall HK module and array performance potential. Computational fluid dynamics can be an important tool in examining the design trades in array configurations for finite riverine environments. One or more embodiments of the present systems and processes can utilize SIMSCALE on the OpenFoam platform in two modalities. The first modality can be referred to as "far-field"—a stretch of canal or river may be first modeled void of HK devices, and then subsequently with a turbine design inserted at a suitable location to evaluate water impact and turbine performance through estimations of water velocity and pressure. In the far-field approach, the turbine may be represented as a porous media rather than as a fully resolved assembly of blades and spokes. This approach constitutes a way of simplifying the turbine into a pressure difference across the turbine area, reducing computational costs by a factor of 100. The resulting pressure difference has both a linear and quadratic dependence on flow velocities and water levels around the unit, an important factor in the dynamic tuning of impedance. The first modality can be referred to as "near-field"—the simulation may be localized to the flume and turbine area, the blade shapes can be explicitly resolved and flow simulations can be done at ~0.01 rad increments through 2-3 full rotations. This "quasi-2D" method provides valuable design information on component forces and potential power generation. Both modalities can be used to elucidate design features of the dynamic tuning module. SIMSCALE has been validated extensively for the two modalities using field data from previous HK deployments and detailed experimental laboratory data.

For example, hydrokinetic turbines operate in a unique environment in which the flow may be constricted by building boundary layers on the riverine floor, banks or walls (if any), and the water surface. The boundary between water and air may be considered a frictionless surface and as such creates no boundary layer. In various embodiments, this allows for the rotor to continue to perform at maximum efficiency up to the water surface of the water because it may be still operating in the "core" flow. If the water level may be increased so the rotor may be fully submerged, and hence water may be flowing over the turbine, turbine efficiency may begin to drop. However, a telescoping blade allows the system to ensure that the blade always reaches as close as possible up to the water level as close as possible to the top of the turbine in various different flow conditions thus avoiding performance drops.

Technical Considerations

Operational efficacy has been demonstrated for a twin turbine system at full scale in various canal environments. General technical considerations include; 1) estimating component forces and designing to those forces within the endurance limits of the chosen materials; 2) operating rotating components and associated bearings under water; and 3) decoupling vibrational loads in the rotating assembly from the power take-off system (gearboxes, direct-drive generators).

Static components can be converted into dynamic components to achieve the improved performance across variable operating conditions. Additionally, operating principles and the water environment can be different in the riverine system and deserve consideration for efficacy.

Figure 6:
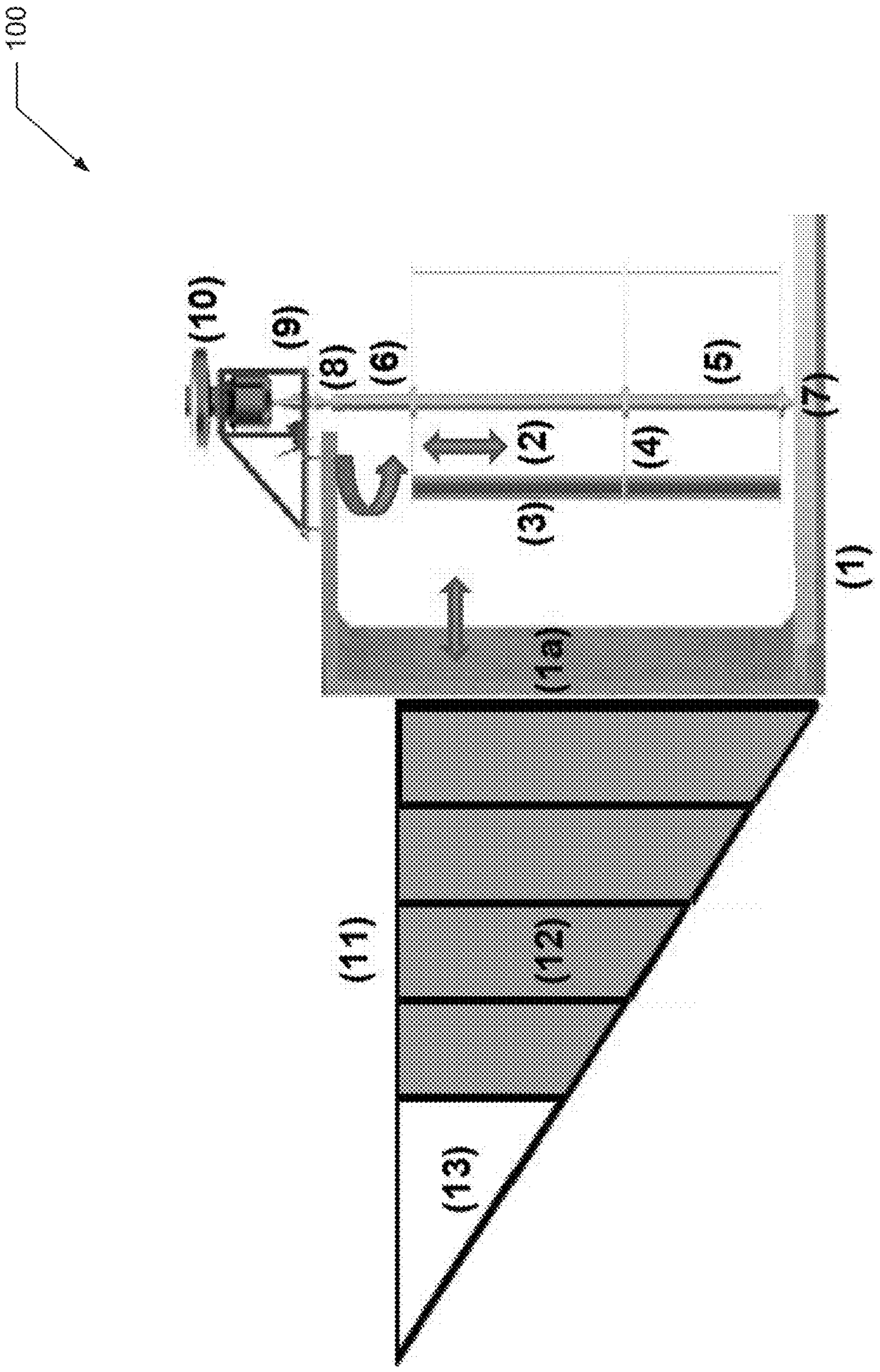
FIG. 6 shows an exemplary hydrokinetic system, according to one embodiment of the present disclosure.

As shown in FIG. 6, the hydrokinetic turbine system 100 of FIG. 1 can include a hydrodynamically designed frame ("flume") (1) with a sidewall (1*a*), a rotor assembly (2) that includes one or more blades (3) stacked vertically and attached at each end to an arm, or spoke (4) that further attaches to the shaft (5) at a hub (6). There can be 2, 3, 4, or greater number of spokes (4). In at least one embodiment, the shaft connects to a lower bearing (7) and an upper bearing (8) and may be physically attached to a power take-off system (9) that includes a vibration isolation device and a gearbox/generator (10). Adjacent to the sidewall may be a transition panel assembly (11) that can fully cover the waterway outside the turbine system, or partially cover the waterway with modular panels (12) and an open area (13) where water can bypass the hydrokinetic turbine system 100.

In one embodiment, the sidewall (1*a*) may be fixed in its position and can be manufactured with the remainder of the flume (1). In some embodiments, the sidewall (1*a*) may be fabricated as a separate component and may be movable, either by rotation about a pivot point or by translation relative to the back of the sidewall. In various embodiments, movement of the sidewall changes the separation between the blade (3) on its closest approach and the sidewall (1*a*). The blade (3) on its closest approach may be moving against the flow and may be considered the power generating portion of the stroke. The blade (3)/sidewall (1*a*) separation distance may impact performance and can change with variations in water velocity. In at least one embodiment, the sidewall (1*a*) moves in and out based on the water velocity in order to improved performance of both single turbines as well as an array of turbines. The exact spacing can also vary from turbine to turbine placed along the direction of flow based on its impact on other turbines in the array.

In one or more embodiments, the blade (3) has the ability to actively increase or decrease in length based upon the water conditions that can be present. By changing length, the blade length can actively track the water depth as it changes.

Optimum conversion of water power into shaft power may occur when the blade (3) is fully submerged. According to one embodiment, if the blade (3) is under-submerged, the conversion efficiency decreases due to the potential for splashing and turbulence. In at least one embodiment, if the blade (3) is significantly over-submerged, water can preferentially flow over the rotor assembly and reduce water velocity through the turbine.

In at least one embodiment, the blade (3) may telescope by having one section of the blade fit within the other section. In a second embodiment, the upper and lower sections of the blade either envelop, or can be enveloped by, a third section the fits between the other two sections. In another embodiment, a third arm or spoke may be attached between the shaft and one of the telescoping sections to provide added structural integrity. Actuation of the telescoping blade (3) may be achieved by suitable mechanisms. In one embodiment, the hub to which the spokes can be attached moves up and down the shaft with mechanical actuators while still maintaining rotational fixation to the shaft. In an alternative embodiment, the central shaft may be also telescoping in a similar manner as the blades and the hub may be fixed on the telescoping shaft.

In various embodiments, the hydrokinetic system 100 dynamically varies pitch of one or more blades (3) to reduce or increase flow through the flume (1) and optimize power generation (e.g., and/or other properties, such as vibration) at one or more rotor assemblies (2). For example, the hydrokinetic system 100 dynamically adjusts blade pitch to optimize an angle of attack between a leading blade surface and water flowing through the flume (1). In at least one embodiment, the hydrokinetic system 100 pitch can adjust blade pitch between about 5-355 degrees, 5-60 degrees, 60-120 degrees, 120-180 degrees, 180-240 degrees, 240-300 degrees, 300-355 degrees, or any suitable angle. In one or more embodiments, the hydrokinetic system 100 independently controls and adjusts each blade (3) of each rotor assembly (2). In one example, a rotor assembly (2) includes a plurality of blades (3) and the hydrokinetic system 100 adjusts a blade pitch of each of the plurality of blades (3) based upon the blade's azimuthal position in a rotor assembly rotation. In at least one embodiment, the rotor assembly (2) includes a cam (e.g., or other suitable mechanism) at each blade (3) for sensing a current pitch of the blade (3) and dynamically adjusting blade pitch to achieve an optimal orientation.

In one or more embodiments, the hydrokinetic system 100 dynamically and independently adjusts a position and/or orientation of each panel (12) of the transition panel assembly (11) to optimize power generation and water flow through the frame (1) and/or an array of hydrokinetic systems 100. In various embodiments, the panel (12) includes a plurality of sub-panels that are independently adjustable to provide full or partial blockage of flow through the panel (12). According to one embodiment, each sub-panel can translate along or rotate within the panel (12) to optimize flow. In one example, in a first state the hydrokinetic system 100 causes sub-panels to orient orthogonally to a flow direction, thereby preventing flow through the panel (12). In the same example, in a second state, the hydrokinetic system 100 causes a plurality of the sub-panels to orient parallel to the flow direction, thereby allowing partial flow through the panel (12). In one or more embodiments, dynamic adjustment of each sub-panel can occur manually or through remote actuation. Sub-panel actuation can occur semi-automatically or automatically in response to a command, a predetermined schedule, or when particular criteria are determined to be present (e.g., a particular water level, power requirement, efficiency, etc.). In one example, the hydrokinetic system 100 receives or generates a command to adjust a percentage of wall coverage (e.g., or a percentage flow) through the transition panel assembly (11). In the same example, based on the command, the hydrokinetic system 100 optimizes one or more panels (12) by causing one or more actuators to rotate and/or translate a plurality of sub-panels such that the specified wall coverage or flow percentage is achieved. In various embodiments, the hydrokinetic system 100 can adjust the transition panel assembly (11) to provide wall coverage percentages of 0-100%.

In one or more embodiments, the hydrokinetic system 100 optimizes two or more of blade pitch, blade length, sidewall position, and transition panel (e.g., or sub-panel) position substantially simultaneously and in substantially real-time to optimize power generation.

Figure 7:
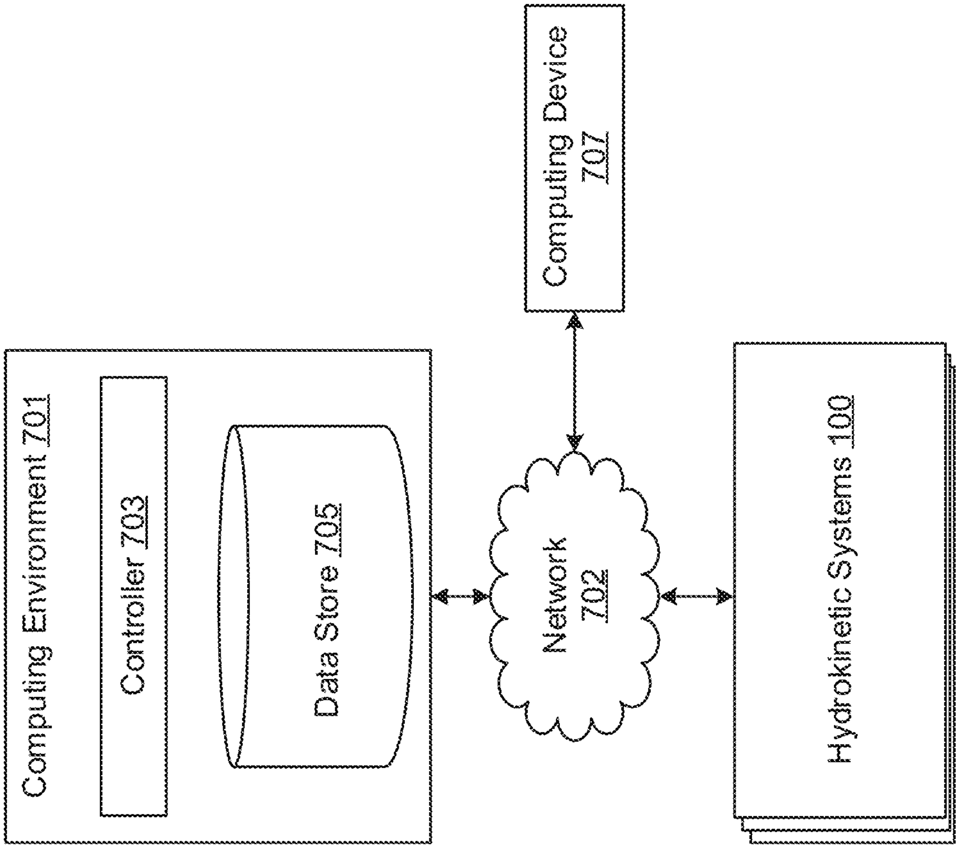
FIG. 7 shows an exemplary computing environment, according to one embodiment of the present disclosure.

FIG. 7 shows a computing environment 701 for controlling one or more hydrokinetic (HK) systems 100 and for carrying out various processes and functions related thereto. In various embodiments, the computing environment 701 includes a controller 703 that performs power and control functions, such as, for example, altering operating and/or structural parameters of the HK system 100. In at least one embodiment, the computing environment 701 includes a data store 705 for storing various information related to processes of the computing environment 701 and the HK system 100, such as, for example, current and historical sensor data. In various embodiments, the computing environment 701 communicates with the hydrokinetic system 100 and one or more computing devices 707 via a network 702. The network 702 includes, for example, the Internet, intranets, extranets, wide area networks (WANs), local area networks (LANs), wired networks, wireless networks, or other suitable networks, etc., or any combination of two or more such networks. For example, such networks may include satellite networks, cable networks, Ethernet networks, and other types of networks. The network 702 can be representative of a plurality of networks.

The computing environment 701 may include, for example, a server computer or any other system providing computing capability. Alternatively, the computing environment 701 may employ computing devices that may be arranged, for example, in one or more server banks or computer banks or other arrangements. Such computing devices may be located in a single installation or may be distributed among many different geographical locations. For example, the computing environment 701 may include computing devices that together may include a hosted computing resource, a grid computing resource and/or any other distributed computing arrangement. In some cases, the computing environment 701 may correspond to an elastic computing resource where the allotted capacity of processing, network, storage, or other computing-related resources may vary over time. In at least one embodiment, the computing environment 701 communicates with the computing device 707 to receive commands, transmit data related to the HK system 100, and/or authenticate access to the computing environment 701 on behalf of a user or another computing environment. Non-limiting examples of the computing device 707 include personal computers, smartphones, tablets, hand-held devices, and Internet of Things (IoT) devices.

Various applications and/or other functionality may be executed in the computing environment 701 according to various embodiments. The controller 703 can receive and process data from the HK system 100, from the data store 705, and from the computing device 707. The controller 703 can include one or more processors and/or servers, and can connect to the data store 705. Data stored in the data store 705 can be associated with the operation of various applications and/or functional entities described herein. Data stored in the data store 705 may be accessible to an aggregated and/or remote computing environment, such as, for example, a cloud-based environment for storing and analyzing data sets.

In at least one embodiment, the computing environment 701 receives data from the HK system 100, which may be stored at the data store 705. In various embodiments, the controller 703 analyzes data associated with the HK system 100 and determines operating and structural parameters for optimizing performance of the HK system 100 (or a plurality of HK systems 100, also referred to as an HK array). The controller 703 can perform various techniques to analyze data including, but not limited to, machine learning techniques, algorithm-based processes, and data modeling processes. In one or more embodiments, the HK system 100 receives commands (e.g., or data that may support execution of a command) from the computing environment 701. In various embodiments, the computing environment 701 can optimize HK system performance by transmitting commands to the HK system 100 dynamically tune operational and/or structural parameters toward an optimized state (e.g., an optimized state of the HK system 100 or an optimized state of an HK array). In one example, the computing environment 701 commands the HK system 100 to adjust a position horizontal and/or a rotational position of a sidewall, raise or lower a rotor, or adjust modular panels to increase or decrease an open area.

Figure 8:
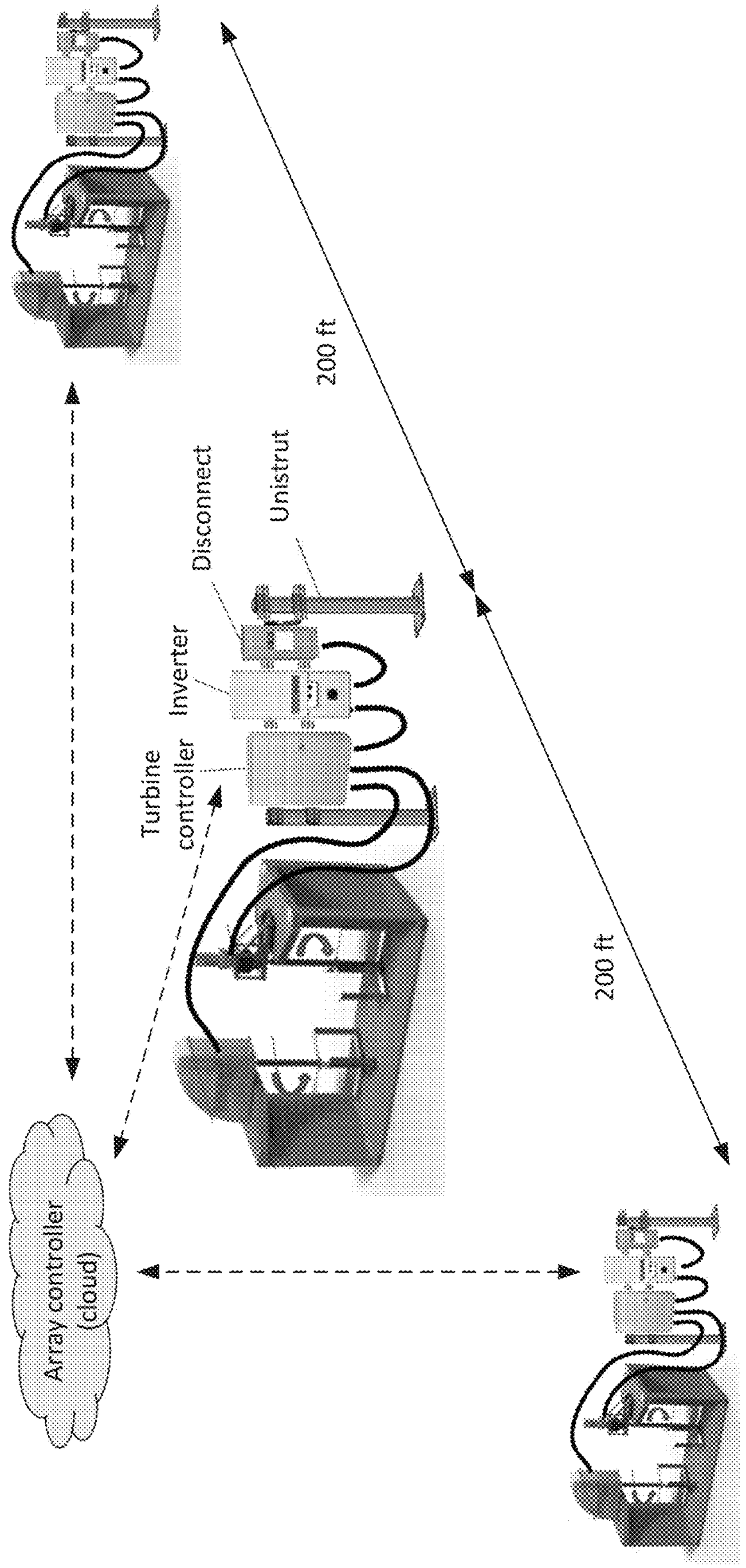
FIG. 8 shows an exemplary hydrokinetic turbine array, according to one embodiment of the present disclosure.

FIG. 8 is an exemplary hydrokinetic turbine system in an array arrangement, according to one embodiment. In various embodiments, a plurality of the hydrokinetic turbine systems discussed herein may be installed in an array arrangement throughout a waterway. For example, and as illustrated in FIG. 8, each hydrokinetic turbine unit may be installed 200 ft away from the next turbine unit. According to various aspects of the present disclosure, the distance between each turbine unit in an array arrangement may be any appropriate distance (e.g., 100 ft, 200 ft, 300 ft, 500 ft, etc.). In certain embodiments, the distance between the turbine units may depend upon certain waterway characteristics such as waterway/channel depth, waterway/channel width, and velocity of the water flowing within the waterway/channel.

In at least one embodiment, each unit in the hydrokinetic turbine array may be interconnected via a controls system. For example, and as illustrated in the present embodiment, each turbine unit may be operatively connected to a cloud-based array controller and array controller network. In various embodiments, the cloud-based array controller may be operatively connected to a turbine controller, an inverter, and a disconnect, each of which are securely mounted to each turbine unit or to a unistrut physically proximate to each turbine unit. In particular embodiments, sensors and other devices at each turbine unit generate data readings based on the waterflow interacting with their respective turbine unit, and those data readings are used for dynamically tuning aspects of the turbine unit. For example, in response to detecting a strong flow velocity, but overall low power generation output relative to the strong flow velocity, a particular turbine unit may initiate an extension of the blades at the particular turbine unit for exposing more blade surface area to the water flowing through the turbine unit. Moreover, as that configuration may impact the water flow both upstream and downstream, turbine units both upstream and downstream may be automatically reconfigured based on the blade length changes at the particular turbine.

In various embodiments, the one or more hydrokinetic turbine systems may be configured by tuning one or more blockage parameters at the turbines. In a particular embodiment, a blockage parameter may include a turbine blade pitch, an angle of a sidewall, a turbine blade height, a sidewall portion and blade distance, or other adjustable aspects of the turbines. According to various aspects of the present disclosure, these configurations are referred to as blockage parameters given that the turbines increase water head (water level at the turbine mouth due to blocking or slowing water flow) as a result of generating power via the turbines. In particular embodiments, while a certain amount of head increase may be necessary for optimal power generation at one turbine unit, too much head generation may become an issue for upstream turbines (for example, too much blockage at a downstream turbine unit prohibits upstream water from continuing its normal flow downstream). Thus, in various embodiments, aspects of the dynamic flume discussed herein, such as a turbine blade pitch, an angle of a sidewall, a turbine blade height, and a sidewall portion and blade distance, each contribute to a blockage parameter at a turbine unit that may be tuned and configured for optimal power generation.

According to various aspects of the present disclosure, each turbine in an array of turbines may generate local data, or data from sensors at one particular turbine, which corresponds to at least water depth and water velocity. In at least one embodiment, this local data may be processed at an electronic computing device physically proximate to the turbine unit, or the local data may be transmitted to a cloud-based computing system for processing. In various embodiments, the cloud computing system processes the local data (e.g., water depth and velocity), and transmits back to the turbine unit one or more configuration instructions for causing the turbine to adjust its blockage parameter (for example, by adjusting an angle of a sidewall portion). In a particular embodiment, local data at one turbine unit may be processed as non-local data at another upstream and/or downstream turbine unit in a turbine array. In certain embodiments, non-local data may be data from another turbine unit in the turbine array that has been processed via the cloud computing environment and is now being used for adjusting a blockage parameter at another turbine unit in the turbine array. In particular embodiments, both local data associated with a particular turbine unit, as well as non-local data from one or more additional turbines in the turbine array, may be processed together for determining a blockage parameter adjustment to be caused at the particular turbine unit.

Figure 9:
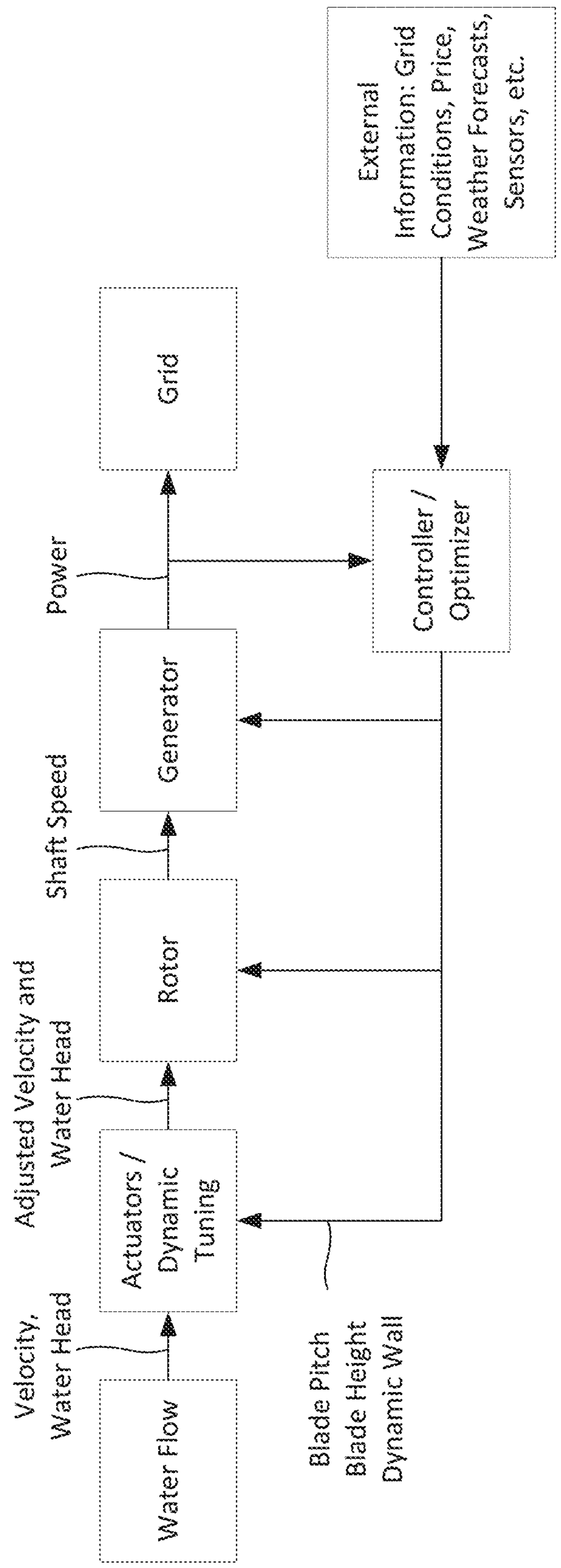
FIG. 9 shows an exemplary controls system, according to one embodiment of the present disclosure.

FIG. 9 shows an exemplary controls system, according to one embodiment of the present disclosure. According to various aspects of the present disclosure, and as shown in the present embodiment, waterflow characteristics such as velocity and water head are input parameters to the system for determining how to optimize power generation. For example, given a water flow velocity and height, aspects of the present disclosure aim to optimize the turbine so that changes in actuators (e.g., to dynamically tune the width of one or more sidewalls) result in optimal rotor shaft speeds, which in turn generate the highest power output. In certain embodiments, this power output is then directed to the power grid. In various embodiments, the controls system includes a controller or optimizer, which may include one or more processors for generating the controls messages that instruct an actuator, for example, to adjust a turbine height or sidewall width. In certain embodiments, external information, such as grid conditions, price, weather, forecasts, and other sensor information, may be received or retrieved by the controller/optimizer for determining when, or if, to instruct an actuator to tune a turbine system. For example, if third-party weather data indicates heavy rain, and thus indicates impending higher water levels, the controls system may preemptively instruct actuators at each turbine in an array of turbines to tune their sidewalls, blade height, blade widths, and blade pitches, to optimize power output.

Figure 10:
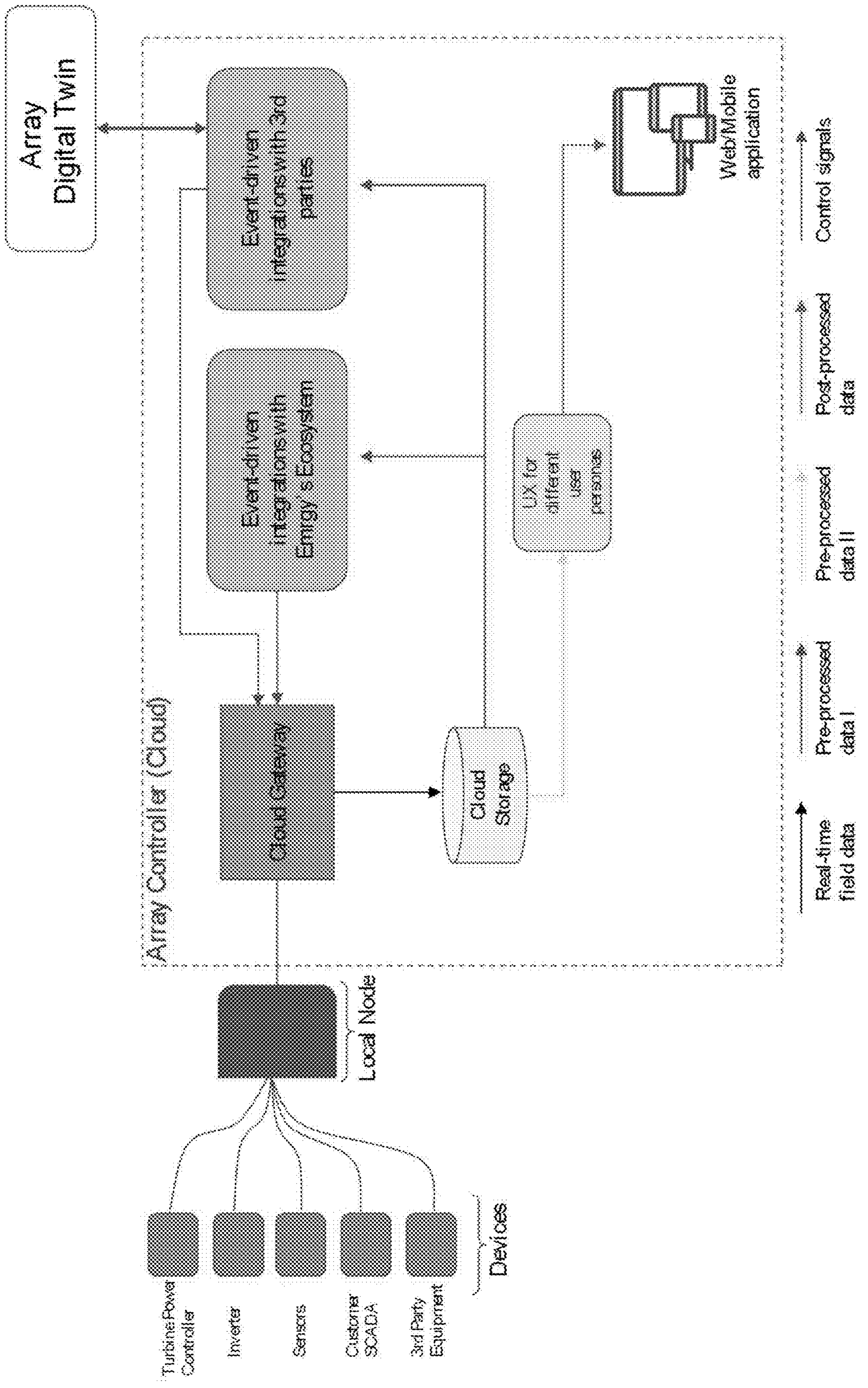
FIG. 10 shows an exemplary software architecture, according to one embodiment of the present disclosure.

Turning now to FIG. 10 an exemplary software architecture is shown, according to one embodiment of the present disclosure. In at least one embodiment, the present embodiment illustrates the cloud computing environment in which data from one or more turbine systems may be processed. In various embodiments, each turbine in a turbine array may be a node in cloud computing architecture. In particular embodiments, each node (or each turbine unit in a turbine array), may include devices such as a turbine controller, one or more inverters, various sensors, SCADA systems, third-party equipment, etc., each of which generate data to be processed in the cloud computing environment.

According to various aspects of the present disclosure, the cloud computing environment includes an array controller configured to processes the data received from the turbine units. In one embodiment, the array controller includes a cloud gateway device that is operatively connected to the local nodes for receiving data from the local nodes. The cloud gateway may also be operatively connected to a cloud storage database in which is stores data received from the nodes. In certain embodiments, the cloud gateway may also receive event-driven notifications, alerts, or other data, from both internal system integrations and third parties. In at least one embodiment, processed turbine node data is configured, or visually modified, to be presented on one or more web/mobile applications for user consumption. In various embodiments, in response to reviewing the node data, a user may instruct for the node (e.g., the turbine) to dynamically adjust its sidewalls, turbine blades, etc., via activating one or more actuators. In certain embodiments, each turbine in a turbine array may be represented in a purely digital environment via a digital twin, or the like.

Figure 11:
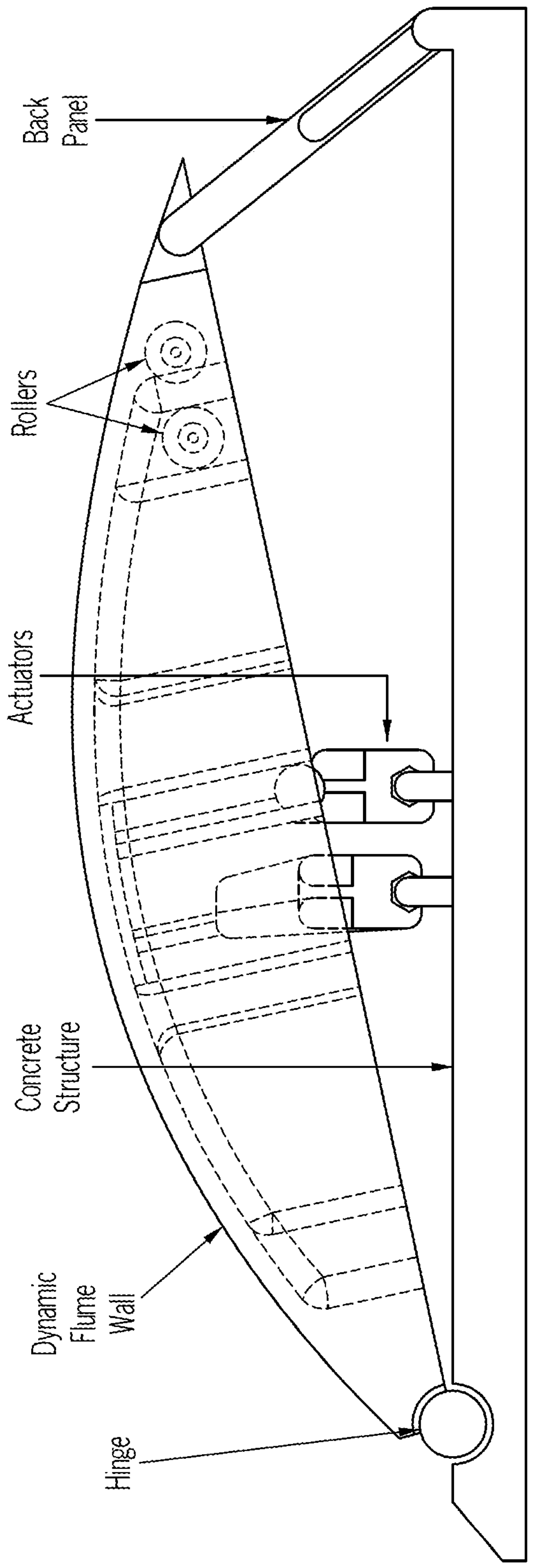
FIG. 11 shows an exemplary dynamic flume wall, according to one embodiment of the present disclosure.

FIG. 11 shows an exemplary dynamic flume wall, according to one embodiment of the present disclosure. In one embodiment, and as discussed throughout the present disclosure, one or more actuators at a turbine system may be used for configuring how a curved sidewall is positioned relative to the turbine blades and shaft. For example, and referring to the present embodiment, the dynamic flume wall includes a hinge at a side of the dynamic flume sidewall opposite from a back panel. In various embodiments, the hinge connects both the sidewall and another wall or concrete structure adjacent to the sidewall. In certain embodiments, the dynamic flume sidewall includes a curvature that accelerates water flowing past the sidewall. In particular embodiments, the dynamic flume sidewall includes one or more actuators that may be controlled via the controls system discussed above in association with FIG. 9. Accordingly, in various embodiments, each hydrokinetic turbine unit in a turbine array may include on or more dynamic flume sidewalls for narrowing or widening the flume width through which water may flow, therefore manipulating the velocity of the water.

Figure 12:
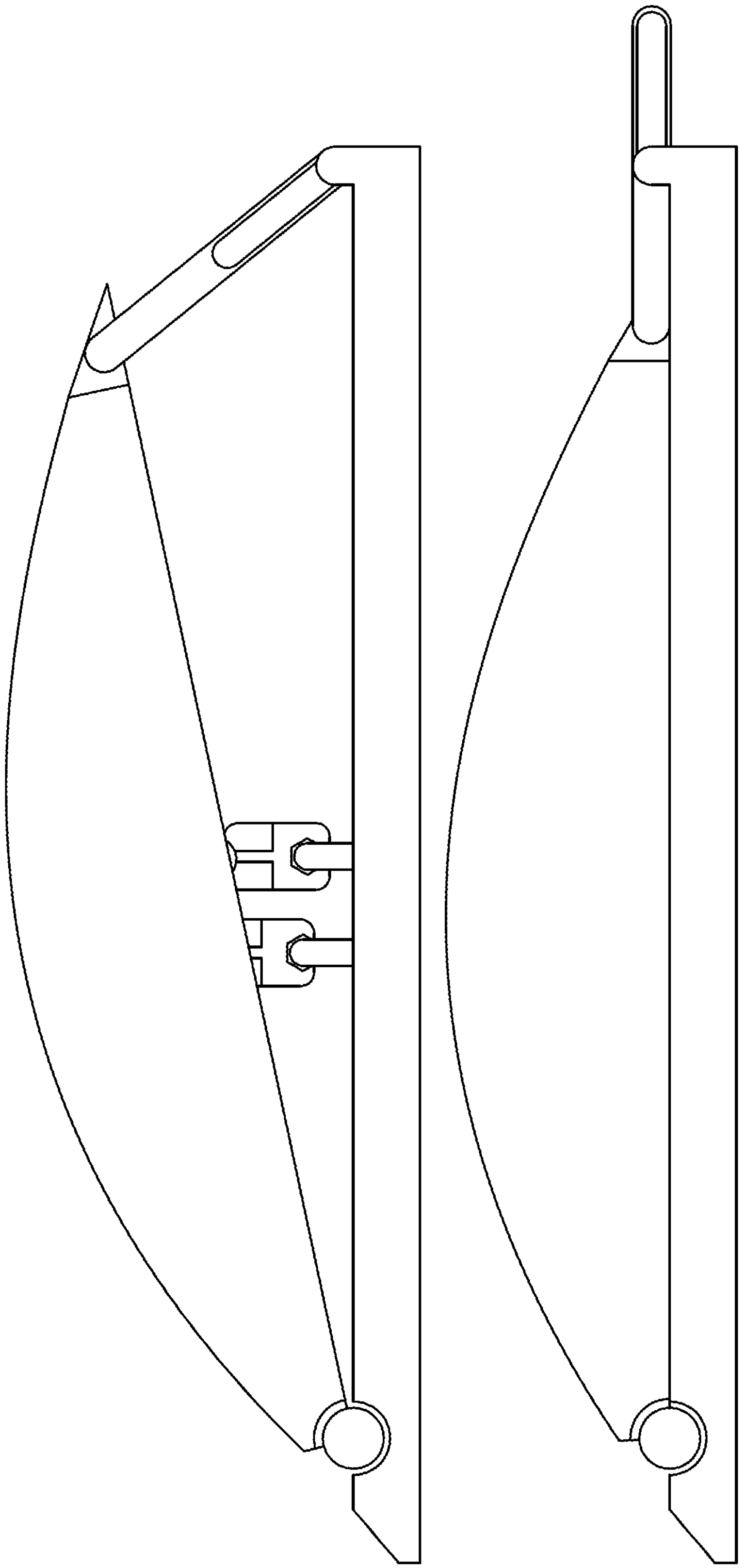
FIG. 12 shows an exemplary dynamic flume wall, according to one embodiment of the present disclosure.

FIG. 12 shows an exemplary dynamic flume wall in both extended and retracted orientations, according to one embodiment of the present disclosure. In various embodiments, and as discussed immediately above in association with the description of FIG. 11, the dynamic flume wall is configured to extend and retract into a flume channel. In certain embodiments, one or more actuators are engaged/activated for extending or retracting the dynamic sidewalls, and the dynamic sidewalls may rotate along a single axis at a hinge securely connecting the dynamic sidewall to an adjacent concrete structure. In at least one embodiment, a back panel at an end of the dynamic sidewall opposite from the hinge may also be connected to the concrete structure via a hinge, a pin, a bearing, or another appropriate mechanism allowing for smooth rotations of heavy objects. In particular embodiments, the back panel may be obround (or rectangular) in shape, and the back panel may also include an obround cutout, slot, or empty space, which defines a track through which the back panel may move with respect to its connection to the concrete structure. For example, in the present embodiment where the dynamic sidewall is shown in an extended orientation, the connection to the concrete structure is located at the rightmost side of the back panel slot. However, in the present embodiment where the dynamic sidewall is shown in a retracted orientation, the connection to the concrete structure is located at the leftmost side of the back panel slot. Accordingly, in certain embodiments, the connection to the concrete structure may move withing the slot based on how extended or retracted the dynamic sidewall is from the concrete structure.

Figure 13:
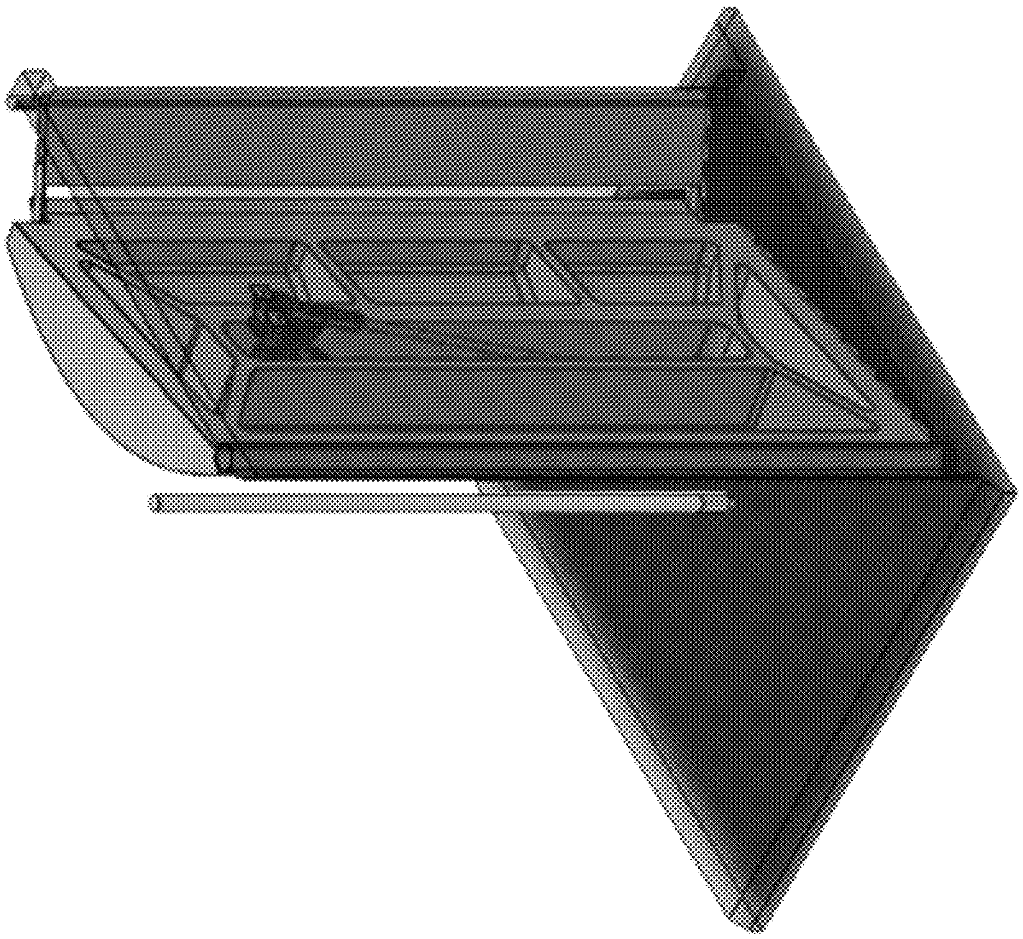
FIG. 13 shows an exemplary dynamic flume wall, according to one embodiment of the present disclosure.

FIG. 13 shows an exemplary dynamic flume wall, according to one embodiment of the present disclosure. Further, the present embodiment shows the dynamic sidewall in an isometric and semi-transparent view. As shown in the present embodiment, the back panel may be substantially rectangular in shape and, and the wall may comprise a height that is generally the same height as the dynamic sidewall height. In certain embodiments, the back panel height may be taller or shorter than the dynamic side panel height. In various embodiments, the back panel may include a width wide enough to cover the space between the dynamic sidewall and the concrete structure formed by the actuators extending the sidewall into the flume channel. In at least one embodiment, the back panel prevents turbulence from forming near the tail end of the dynamic sidewall, which would reduce power generation output.

Figure 14:
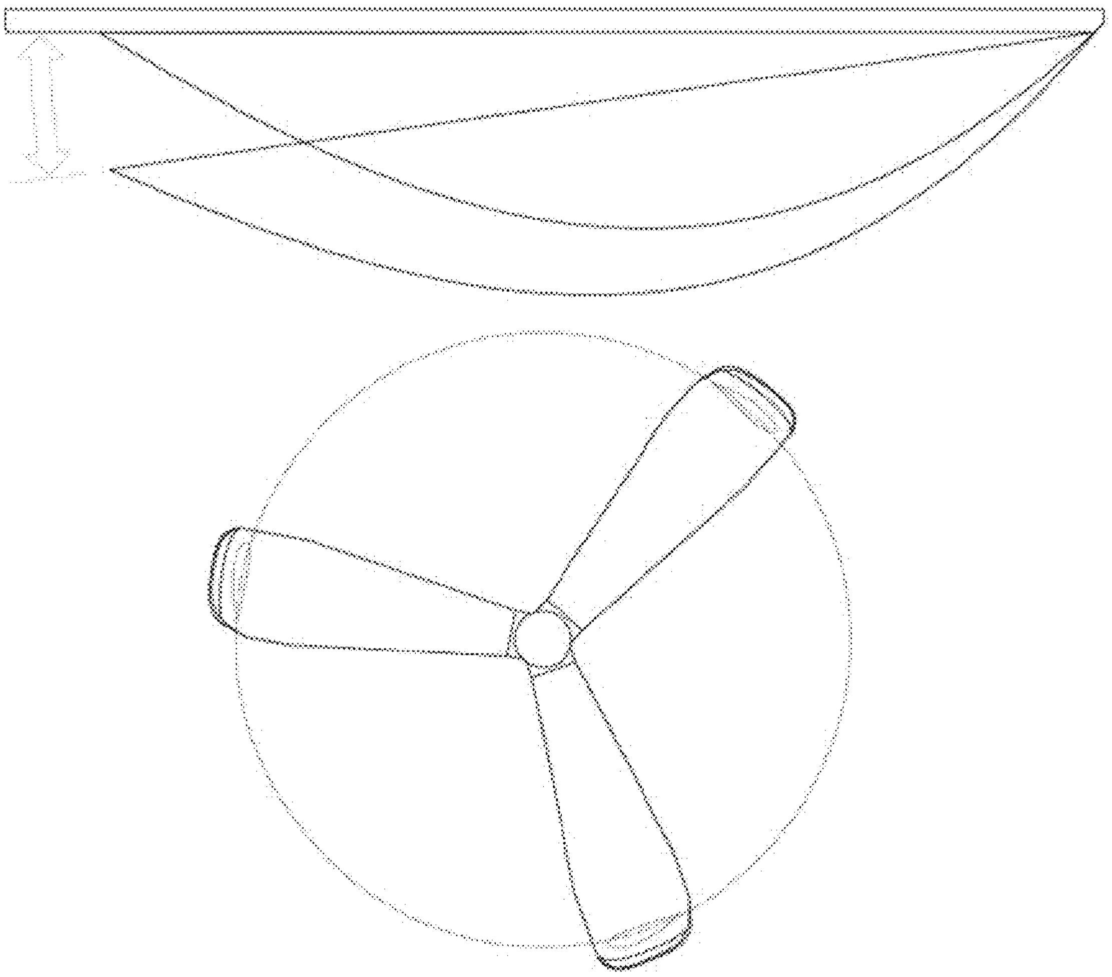
FIG. 14 illustrates exemplary dynamic flume wall width extension and retraction, according to one embodiment of the present disclosure.

FIG. 14 illustrates exemplary dynamic flume wall width extension and retraction according to one embodiment of the present disclosure. According to various aspects of the present disclosure, the present embodiment illustrates how the dynamic flume sidewall may pivot around a hinge for extending the sidewall closer to the one or more turbines positioned within the flume. In at least one embodiment, extending or retracting the dynamic sidewall moves the position of the sidewall apex (or furthest extended/protruding point of the sidewall) with respect to the turbine. For example, given the convex curvature of the dynamic sidewall, a single point on the sidewall will always be closer to the turbine than other points on the sidewall. By extending or retracting the dynamic sidewall, the sidewall apex may be repositioned, thus creating a stronger or weaker curvature for the water flow to encounter (a sidewall apex closer to the flume mouth represents a stronger curve than an apex closer to the exit).

Figure 15:
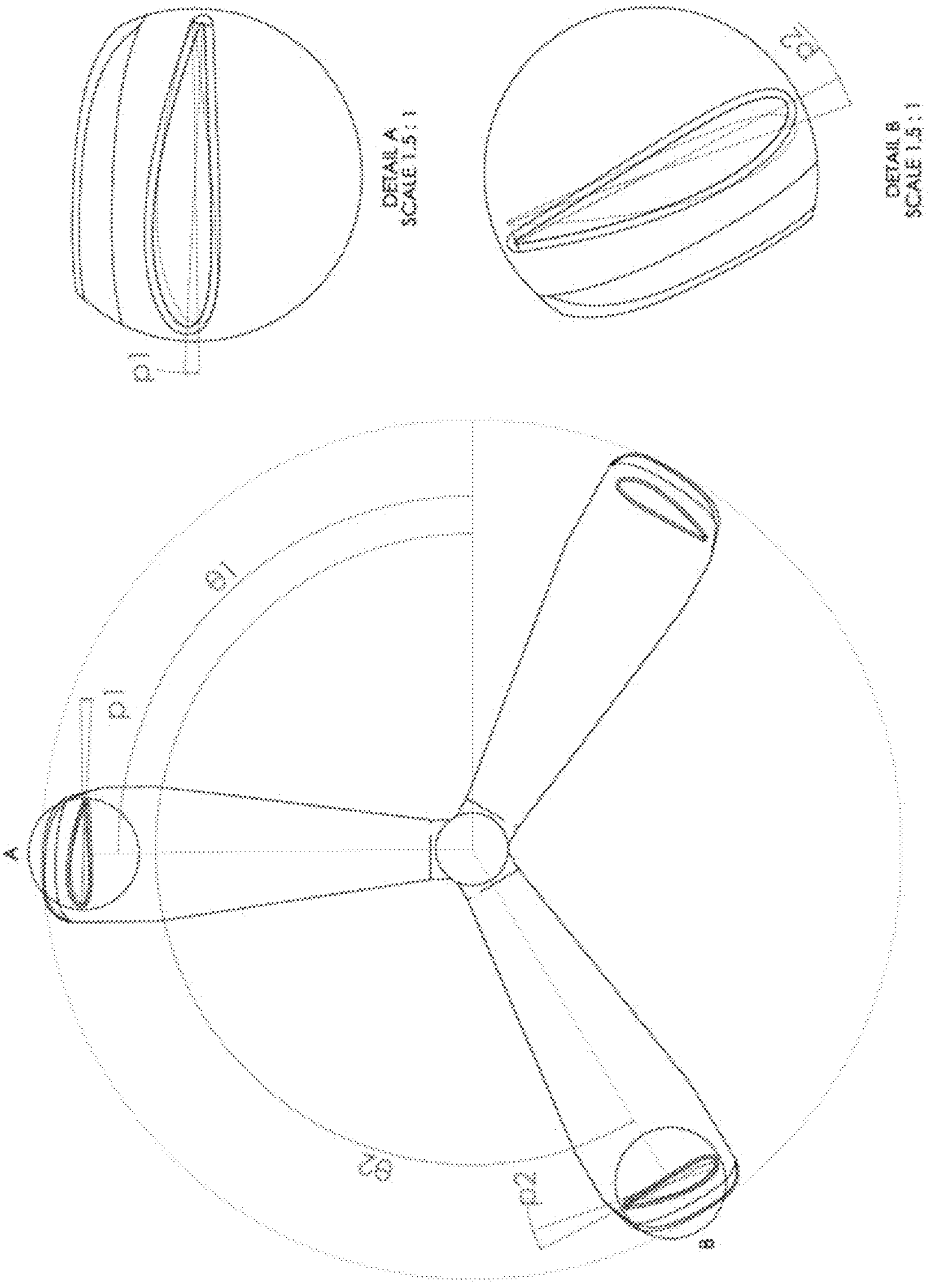
FIG. 15 illustrates an exemplary dynamic flume blade, according to one embodiment of the present disclosure.

FIG. 15 illustrates an exemplary dynamic flume blade, according to one embodiment of the present disclosure. In various embodiments, the flume blades may be dynamically adjusted in length, width, and pitch, for optimizing power outputs. In particular embodiments, each blade on the turbine may be configured to adjust its respective pitch during operation. As will be understood by one of ordinary skill in the art, pitch relates to the degree of rotation around a particular axis (generally perpendicular to the longitudinal plane of symmetry), and is often referred to "nose up" or "nose down." Accordingly, adjusting the pitch of a turbine blade includes rotating the blade on an axis so that the leading edge of the blade encounters water flow at a stronger or weaker angle of attack. According to various aspects of the present disclosure, the pitch of each blade on a turbine may be dynamically adjusted throughout the blade's revolution around the turbine shaft, thus allowing for the blade pitch to be optimized at all points along its revolution.

Figure 16:
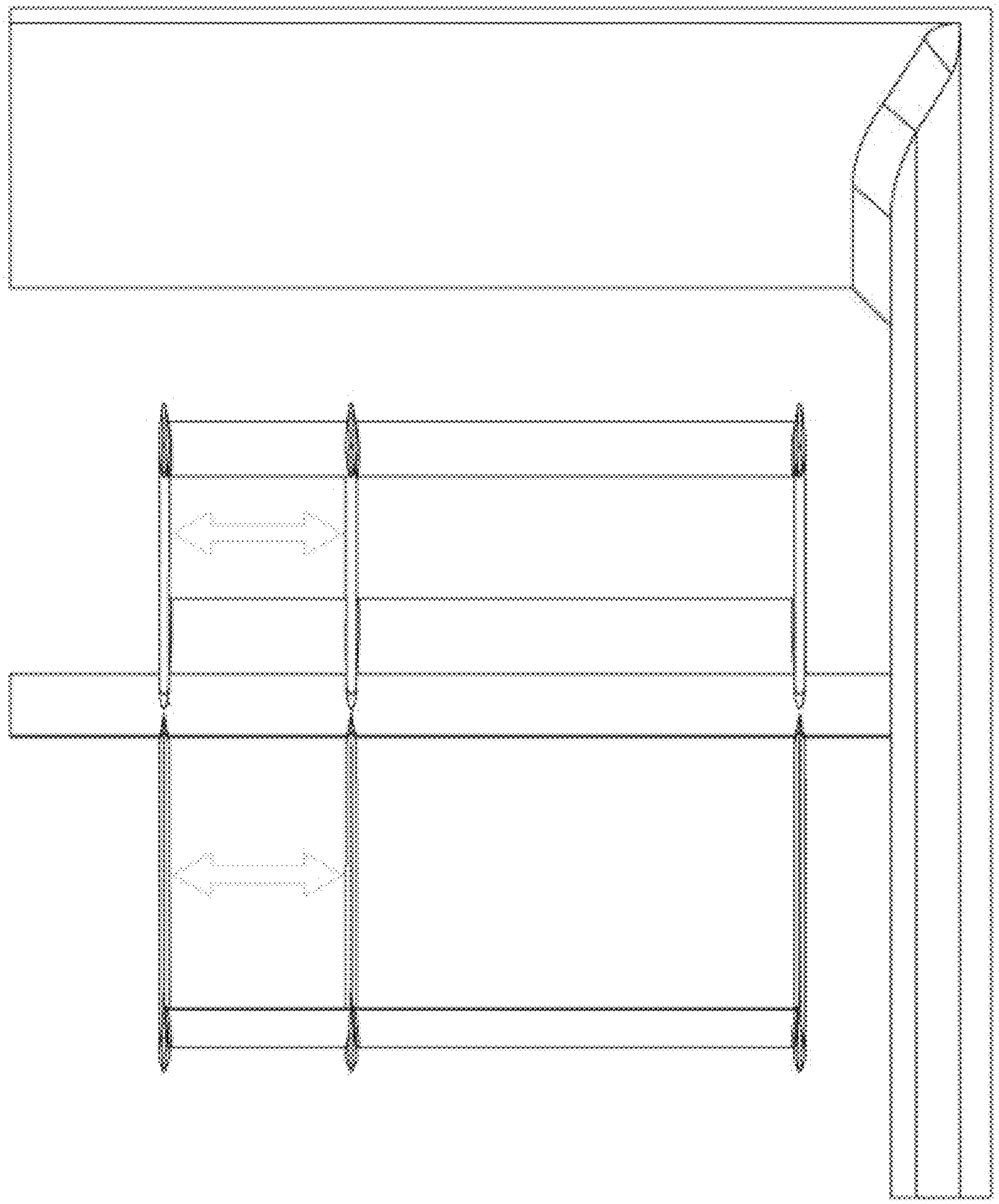
FIG. 16 illustrates exemplary dynamic flume turbine height extension and retraction, according to one embodiment of the present disclosure.

FIG. 16 illustrates exemplary dynamic flume turbine height extension and retraction, according to one embodiment of the present disclosure. In various embodiments, each turbine blade may be dynamically adjusted up or down to optimize the total blade surface area encountering the water flow. As shown in the present embodiment, each turbine shaft may include multiple blades perpendicular to the turbine shaft. Further, each turbine may include three sets of blades: a top set, a middle set, and a bottom set. In most embodiments, the bottom set of blades will typically always encounter water flow given its position. However, depending on the flow height, in certain embodiments, the middle or top blades may not encounter water flow given their location on the turbine shaft. Accordingly, and in particular embodiments, the controls system may instruct for actuators at the turbine to lower the top and/or middle blades to a height below that ensure the blades are submerged in the waterflow. In various embodiments, the blade heights may also be configured such that each set of blades are separated by substantially similar (or the same distances), thus preventing turbulence from one blade detracting from another blade's ability to operate effectively.

Additional Aspects

Various aspects of the present systems and methods will now be described. It will be understood by one of ordinary skill in the art that any of the aspects below may incorporate and include any other aspects mentioned below or features described herein. Therefore, the aspects below should be understood to include any combination of aspects and should not be limited to the combinations presented below. For example, although the second aspect includes the subject matter and features of the first aspect, it may also include features of the twenty-sixth aspect, the first aspect, the thirtieth aspect, or any other aspect.

According to a first aspect, the disclosed systems and methods may include a system for generating power comprising: two or more turbines for operating within an open canal system, each of the two or more turbines remotely connected to a computing system comprising at least one processor, the at least one processor configured for: A) receiving data from a first turbine of the two or more turbines indicating the first turbine is generating a first level of power; B) receiving data from the first turbine indicating that the first turbine is generating a second level of power, the second level of power less than the first level of power; and C) based at least in part on receiving the data from the first turbine indicating that the first turbine is generating the second level of power, automatically causing a second turbine of the two or more turbines to tune one or more blockage parameters.

According to a second aspect, or any other aspect, the second turbine is downstream from the first turbine.

According to a third aspect, or any other aspect, the one or more blockage parameters comprise: a) a turbine blade pitch, b) an angle of a sidewall, or c) a turbine blade height.

According to a fourth aspect, or any other aspect, each of the two or more turbines comprise an adjustable sidewall.

According to a fifth aspect, or any other aspect, automatically causing the second turbine to tune one or more blockage parameters comprises changing an angle of the adjustable sidewall.

According to a sixth aspect, or any other aspect, each of the two or more turbines comprise at least one turbine comprising one or more blades.

According to a seventh aspect, or any other aspect, the one or more blades comprise an adjustable pitch.

According to an eighth aspect, or any other aspect, automatically causing the second turbine to tune one or more blockage parameters comprises changing the adjustable pitch.

According to a ninth aspect, or any other aspect, the one or more blades comprise an adjustable height.

According to a tenth aspect, or any other aspect, automatically causing the second turbine to tune one or more blockage parameters comprises changing the adjustable height.

According to an eleventh aspect, or any other aspect, the computing system is configured for optimizing power output of the first turbine and the second turbine.

According to a twelfth aspect, the disclosed systems and methods include a hydrokinetic system comprising: an array of turbines installed within a waterway, each of the array of turbines comprising: a turbine frame comprising a top portion, a bottom portion, and a sidewall portion; a rotating vertical rotor housed within the frame, the rotor comprising: a shaft connected to at least the top portion of the turbine frame; a blade operatively connected to the shaft, wherein the blade is parallel to the shaft; a computing system operatively connected to one or more local sensors configured for: transmitting local sensor data to a cloud computing system; and receiving data from the cloud computing system; and a cloud computing system communicably connected to each of the array of turbines and comprising at least one processor configured for: receiving local sensor data from each of the array of turbines; and optimizing power output of the array of turbines by causing one or more of the array of turbines to adjust a blockage parameter, wherein the blockage parameter comprises one or more of: a sidewall portion angle; a blade pitch; a blade length; and a sidewall portion and blade distance.

According to a thirteenth aspect, or any other aspect, the local sensor data comprises local water depth and velocity data.

According to a fourteenth aspect, or any other aspect, causing one or more of the array of turbines to adjust the blockage parameter comprises causing a first turbine of the array of turbines to adjust an angle of the first turbine sidewall portion.

According to a fifteenth aspect, or any other aspect, causing one or more of the array of turbines to adjust the blockage parameter comprises causing a second turbine of the array of turbines to adjust an angle of the second turbine sidewall portion.

According to a sixteenth aspect, or any other aspect, causing one or more of the array of turbines to adjust the blockage parameter comprises causing a second turbine of the array of turbines to adjust a pitch of the second turbine blade.

According to a seventeenth aspect, or any other aspect, causing the one or more of the array of turbines to adjust the blockage parameter comprises causing a second turbine of the array of turbines to adjust a length of the second turbine blade.

According to an eighteenth aspect, or any other aspect, causing the one or more of the array of turbines to adjust the blockage parameter comprises causing a second turbine of the array of turbines to adjust a distance between the second turbine sidewall portion and the second turbine blade.

According to a nineteenth aspect, or any other aspect, causing one or more of the array of turbines to adjust the blockage parameter comprises causing a first turbine of the array of turbines to adjust a pitch of the first turbine blade.

According to a twentieth aspect, or any other aspect, causing one or more of the array of turbines to adjust the blockage parameter comprises causing a second turbine of the array of turbines to adjust an angle of the second turbine sidewall portion.

According to a twenty-first aspect, or any other aspect, causing one or more of the array of turbines to adjust the blockage parameter comprises causing a second turbine of the array of turbines to adjust a pitch of the second turbine blade.

According to a twenty-second aspect, or any other aspect, causing the one or more of the array of turbines to adjust the blockage parameter comprises causing a second turbine of the array of turbines to adjust a length of the second turbine blade.

According to a twenty-third aspect, or any other aspect, causing the one or more of the array of turbines to adjust the blockage parameter comprises causing a second turbine of the array of turbines to adjust a distance between the second turbine sidewall portion and the second turbine blade.

According to a twenty-fourth aspect, or any other aspect, causing one or more of the array of turbines to adjust the blockage parameter comprises causing a first turbine of the array of turbines to adjust a length of the first turbine blade.

According to a twenty-fifth aspect, or any other aspect, causing one or more of the array of turbines to adjust the blockage parameter comprises causing a second turbine of the array of turbines to adjust an angle of the second turbine sidewall portion.

According to a twenty-sixth aspect, or any other aspect, causing one or more of the array of turbines to adjust the blockage parameter comprises causing a second turbine of the array of turbines to adjust a pitch of the second turbine blade.

According to a twenty-seventh aspect, or any other aspect, causing the one or more of the array of turbines to adjust the blockage parameter comprises causing a second turbine of the array of turbines to adjust a length of the second turbine blade.

According to a twenty-eighth aspect, or any other aspect, causing the one or more of the array of turbines to adjust the blockage parameter comprises causing a second turbine of the array of turbines to adjust a distance between the second turbine sidewall portion and the second turbine blade.

According to a twenty-ninth aspect, or any other aspect, causing one or more of the array of turbines to adjust the blockage parameter comprises causing a first turbine of the array of turbines to adjust a distance between the first turbine sidewall portion and the first turbine blade.

According to a thirtieth aspect, or any other aspect, causing one or more of the array of turbines to adjust the blockage parameter comprises causing a second turbine of the array of turbines to adjust an angle of the second turbine sidewall portion via one or more actuators.

According to a thirty-first aspect, or any other aspect, causing one or more of the array of turbines to adjust the blockage parameter comprises causing a second turbine of the array of turbines to adjust a pitch of the second turbine blade.

According to a thirty-second aspect, or any other aspect, causing the one or more of the array of turbines to adjust the blockage parameter comprises causing a second turbine of the array of turbines to adjust a length of the second turbine blade.

According to a thirty-third aspect, or any other aspect, causing the one or more of the array of turbines to adjust the blockage parameter comprises causing a second turbine of the array of turbines to adjust a distance between the second turbine sidewall portion and the second turbine blade.

According to a thirty-fourth aspect, the present systems and methods discuss a hydrokinetic system comprising: a twin-turbine system for installation within a waterway and comprising: a turbine frame comprising a top portion, a bottom portion, and a sidewall portion; two rotating vertical turbine rotors housed within the frame, the two rotating turbine rotors each comprising: a shaft connected to at least the top portion of the turbine frame; a blade operatively connected to the shaft, wherein the blade is parallel to the shaft; a computing system comprising at least one processor operatively connected to: a cloud computing system; at least one local waterway sensor, wherein the at least one processor is configured for: receiving local waterway data from the at least one local waterway sensor; transmitting the local waterway data to the cloud computing system; receiving non-local waterway data from the cloud computing system; and automatically adjusting one or more blockage parameters corresponding with a physical feature of the turbine frame based on the local waterway data and/or non-local waterway data.

According to a thirty-fifth aspect, or any other aspect, the turbine frame further comprises a transition operatively connected to the sidewall portion, the transition configured for blocking a portion of the waterway and directing water through the turbine frame.

According to a thirty-sixth aspect, or any other aspect, the twin-turbine system is a first twin-turbine system; and the non-local waterway data is derived from a second twin-turbine system within the waterway.

According to a thirty-seventh aspect, or any other aspect, automatically adjusting the one or more blockage parameters comprises adjusting one or more of: a) an angle of the sidewall portion; b) a pitch of the blade; c) a length of the blade; and d) a distance between an apex of the sidewall portion and the blade.

According to a thirty-eighth aspect, the present disclosure discusses a process for optimizing power output of a hydrokinetic turbine system comprising: receiving first waterway data from a first twin-turbine, the first waterway data comprising water depth and velocity local to the first twin-turbine; receiving second waterway data from a second twin-turbine, the second waterway data comprising depth and velocity local to the second twin-turbine; and causing the first twin-turbine to adjust a blockage parameter, thereby optimizing power output of the first twin-turbine and second twin-turbine, wherein the blockage parameter comprises one or more of: an angle of a sidewall portion of the first twin turbine; a pitch of a blade of the first twin turbine; a length of a blade of the first twin turbine; and a distance between an apex of a sidewall portion and a blade of the first twin-turbine.

According to a thirty-ninth aspect, the present disclosure discusses a hydrokinetic system comprising: a twin-turbine system for installation within a waterway and comprising: a turbine frame comprising a top portion, a bottom portion, and a sidewall portion; two rotating vertical turbine rotors housed within the frame, the two rotating turbine rotors each comprising: a shaft connected to at least the top portion of the turbine frame; a blade operatively connected to the shaft, wherein the blade is parallel to the shaft; a computing system comprising at least one processor operatively connected to: a cloud computing system; at least one local waterway sensor, wherein the at least one processor is configured for: receiving local waterway data from the at least one local waterway sensor; transmitting the local waterway data to the cloud computing system; receiving non-local waterway data from the cloud computing system; automatically adjusting one or more blockage parameters corresponding with a physical feature of the turbine frame based on the local waterway data and/or non-local waterway data; and automatically adjusting the one or more blockage parameters comprises adjusting one or more of: a) an angle of the sidewall portion; b) a pitch of the blade; c) a length of the blade; and d) a distance between an apex of the sidewall portion and the blade.

According to a fortieth aspect, the present disclosure discusses a hydrokinetic energy system comprising: a turbine for installation within a waterway, the turbine comprising: a turbine frame comprising a top portion, a bottom portion, and a sidewall portion; a rotating vertical turbine rotor housed within the turbine frame, the turbine rotor comprising: a shaft connected to at least the top portion of the turbine frame; a blade operatively connected to the shaft; and a computing system comprising at least one processor configured for receiving data and automatically adjusting one or more blockage parameters comprising: a) an angle of the sidewall portion, b) a pitch of the blade, c) a length of the blade, and d) a distance between an apex of the sidewall portion and the blade.

According to a forty-first aspect, or any other aspect, the computing system is configured for adjusting the one or more blockage parameters based on receiving an indication that a second turbine is generating a sub-optimal amount of power.

According to a forty-second aspect, or any other aspect, the blade is operatively connected to the shaft via a telescoping arm; and the computing system is configured for adjusting the distance of between the apex of the sidewall portion and the blade by adjusting one or more of: i) the angle of the sidewall portion; and ii) the telescoping arm.

According to a forty-third aspect, or any other aspect, the computing system is configured for automatically adjusting a shape of the sidewall.

According to a forty-fourth aspect, or any other aspect, adjusting the blade length comprises increasing or decreasing a length of the shaft.

According to a forty-fifth aspect, or any other aspect, the at least one processor is configured for receiving data from a flow sensor operatively connected to the at least one processor.

According to a forty-sixth aspect, or any other aspect, the at least one processor is configured for receiving data from a depth sensor operatively connected to the at least one processor.

According to a forty-seventh aspect, or any other aspect, the computing system is configured for automatically adjusting the one or more blockage parameters based on water depth and velocity determined from the data received from the flow sensor and the depth sensor.

According to a forty-eighth aspect, or any other aspect, the at least one processor is configured for receiving data from a cloud computing system operatively connected to the at least one processor and a second computing system associated with a second turbine in the waterway.

According to a forty-ninth aspect, or any other aspect, the at least one processor is configured for automatically adjusting the one or more blockage parameters based on the data received from the cloud computing system.

According to a fiftieth aspect, or any other aspect, the hydrokinetic energy system further comprises one or more transition panels operatively connected to the sidewall portion and configured for blocking a portion of the waterway and funneling water through the turbine frame.

CONCLUSION

From the foregoing, it can be understood that various aspects of the processes described herein can be software processes that execute on computer systems that form parts of the system. Accordingly, it can be understood that various embodiments of the system described herein can be generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs)

or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information may be transferred or provided over a network or another communications connection (either hardwired, wireless, or a combination of hardwired or wireless) to a computer, the computer properly views the connection as a computer-readable medium. Thus, any such connection may be properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art can understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules can be often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art can also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system can be practiced in distributed computing environments where tasks can be performed by local and remote processing devices that can be linked (either by hardwired links, wireless links, or by a combination of hardwired or wireless links) through a communications network. In a distributed computing environment, program modules may be located in both local and remote memory storage devices.

An exemplary system for implementing various aspects of the described operations, which may be not illustrated, includes a computing device including a processing unit, a system memory, and a system bus that couples various system components including the system memory to the processing unit. The computer can typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as may be known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices can be often connected to the processing unit through known electrical, optical, or wireless connections.

The computer that effects many aspects of the described processes can typically operate in a networked environment using logical connections to one or more remote computers or data sources, which can be described further below. Remote computers may be another personal computer, a server, a router, a network PC, a peer device or other common network node, and typically include many or all of the elements described above relative to the main computer system in which the systems can be embodied. The logical connections between computers include a local area network (LAN), a wide area network (WAN), virtual networks (WAN or LAN), and wireless LANs (WLAN) that can be presented here by way of example and not limitation. Such networking environments can be commonplace in office-wide or enterprise-wide computer networks, intranets, and the Internet.

When used in a LAN or WLAN networking environment, a computer system implementing aspects of the system may be connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It can be appreciated that the network connections described or shown can be exemplary and other mechanisms of establishing communications over wide area networks or the Internet may be used.

While various aspects have been described in the context of a preferred embodiment, additional aspects, features, and methodologies of the claimed systems can be readily discernible from the description herein, by those of ordinary skill in the art. Many embodiments and adaptations of the disclosure and claimed systems other than those herein described, as well as many variations, modifications, and equivalent arrangements and methodologies, can be apparent from or reasonably suggested by the disclosure and the foregoing description thereof, without departing from the substance or scope of the claims. Furthermore, any sequence (s) and/or temporal order of steps of various processes described and claimed herein can be those considered to be the best mode contemplated for carrying out the claimed systems. It should also be understood that, although steps of various processes may be shown and described as being in a preferred sequence or temporal order, the steps of any such processes can be not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same can become apparent from the information disclosed in the exhibits and the other applications as incorporated by reference. Variations and modifications to the disclosed systems and methods may be effected without departing from the spirit and scope of the novel concepts of the disclosure.

It can, nevertheless, be understood that no limitation of the scope of the disclosure may be intended by the information disclosed in the exhibits or the applications incorporated by reference; any alterations and further modifications of the described or illustrated embodiments, and any further applications of the principles of the disclosure as illustrated therein can be contemplated as would normally occur to one skilled in the art to which the disclosure relates.

The foregoing description of the exemplary embodiments has been presented only for the purposes of illustration and description and may be not intended to be exhaustive or to limit the devices and methods for using the same to the precise forms disclosed. Many modifications and variations can be possible in light of the above teaching.

The embodiments were chosen and described in order to explain the principles of the devices and methods for using the same and their practical application so as to enable others skilled in the art to utilize the devices and methods for using the same and various embodiments and with various modifications as can be suited to the particular use contemplated. Alternative embodiments can become apparent to those skilled in the art to which the present devices and methods for using the same pertain without departing from their spirit and scope. Accordingly, the scope of the present devices and methods for using the same may be defined by the appended claims rather than the foregoing description and the exemplary embodiments described therein.

What is claimed is:

1. A system for generating power comprising:

two or more turbines for operating within an open canal system, each of the two or more turbines remotely connected to a computing system comprising at least one processor, the at least one processor configured for:

receiving data from a first turbine of the two or more turbines indicating the first turbine is generating a first level of power;

receiving data from the first turbine indicating that the first turbine is generating a second level of power, the second level of power less than the first level of power; and based at least in part on receiving the data from the first turbine indicating that the first turbine is generating the second level of power, automatically causing a second turbine of the two or more turbines to tune one or more blockage parameters.

2. The system claim 1, wherein the second turbine is downstream from the first turbine.

3. The system of claim 1, wherein the one or more blockage parameters comprise: a) a turbine blade pitch, b) an angle of a sidewall, or c) a turbine blade height.

4. The system of claim 1, wherein each of the two or more turbines comprise an adjustable sidewall.

5. The system of claim 4, wherein automatically causing the second turbine to tune one or more blockage parameters comprises changing an angle of the adjustable sidewall.

6. The system of claim 1, wherein each of the two or more turbines comprise at least one turbine comprising one or more blades.

7. The system of claim 6, wherein the one or more blades comprise an adjustable pitch.

8. The system of claim 7, wherein automatically causing the second turbine to tune one or more blockage parameters comprises changing the adjustable pitch.

9. The system of claim 6, wherein the one or more blades comprise an adjustable height.

10. The system of claim 9, wherein automatically causing the second turbine to tune one or more blockage parameters comprises changing the adjustable height.

11. The system of claim 1, wherein the computing system is configured for optimizing power output of the first turbine and the second turbine.

* * * * *